United States Patent
Mucha et al.

(10) Patent No.: US 11,430,139 B2
(45) Date of Patent: Aug. 30, 2022

(54) REGISTRATION METHOD AND SETUP

(71) Applicant: Intersect ENT International GmbH, Hennigsdorf (DE)

(72) Inventors: Dirk Mucha, Glienicke/Nordbahn (DE); Kai Desinger, Berlin (DE); Nicholas Norman, Charlotte, NC (US)

(73) Assignee: Intersect ENT International GmbH, Hennigsdorf (DE)

( * ) Notice: Subject to any disclaimer, the term of this patent is extended or adjusted under 35 U.S.C. 154(b) by 0 days.

(21) Appl. No.: 17/492,057

(22) Filed: Oct. 1, 2021

(65) Prior Publication Data

US 2022/0020161 A1 Jan. 20, 2022

Related U.S. Application Data

(63) Continuation of application No. PCT/EP2020/059643, filed on Apr. 3, 2020.

(51) Int. Cl.
*G06T 7/30* (2017.01)
*G06T 7/70* (2017.01)
(Continued)

(52) U.S. Cl.
CPC ............ *G06T 7/30* (2017.01); *G06T 7/70* (2017.01); *G06T 17/00* (2013.01); *G06V 20/00* (2022.01);
(Continued)

(58) Field of Classification Search
None
See application file for complete search history.

(56) References Cited

U.S. PATENT DOCUMENTS

| 4,905,698 A | 3/1990 | Strohl |
| 5,554,155 A | 9/1996 | Awh |

(Continued)

FOREIGN PATENT DOCUMENTS

| CN | 101084840 | 12/2007 |
| CN | 102056544 A | 5/2011 |

(Continued)

OTHER PUBLICATIONS

Pflugi et al. Augmented marker tracking for per-acitabular osteotomy surgery, IEEE, Jul. 11, 2017. (Year: 2017).*

(Continued)

*Primary Examiner* — James M Anderson, II
(74) *Attorney, Agent, or Firm* — Cooley LLP

(57) ABSTRACT

The invention relates to a registration method for determining position and orientation of an object in relation to a position detection system, wherein the method comprises the steps of
capturing an image of a surface of an object with an image sensor unit comprising at least one motion sensor and/or at least one position sensor,
determining a capturing position of the image sensor unit in a coordinate system of the position detection system by processing motion sensor signals provided by said motion sensor and/or position signals provided by said position sensor,
photogrammetrically generating a surface model of the object from the captured image, and
transforming the photogrammetrically generated surface model into the coordinate system of a position detection system.

18 Claims, 9 Drawing Sheets

Related U.S. Application Data

(60) Provisional application No. 62/828,638, filed on Apr. 3, 2019.

(51) Int. Cl.
*H04N 13/204* (2018.01)
*G06V 20/00* (2022.01)
*G06T 17/00* (2006.01)
*H04N 5/247* (2006.01)

(52) U.S. Cl.
CPC ........... *H04N 5/247* (2013.01); *H04N 13/204* (2018.05); *G06T 2207/10028* (2013.01); *G06T 2207/10048* (2013.01); *G06T 2207/30201* (2013.01)

(56) References Cited

U.S. PATENT DOCUMENTS

| | | |
|---|---|---|
| 5,586,989 A | 12/1996 | Bray |
| 5,840,024 A | 11/1998 | Taniguchi |
| 5,944,023 A | 8/1999 | Johnson |
| 5,964,759 A | 10/1999 | Yamanashi |
| 5,971,997 A | 10/1999 | Guthrie |
| 6,011,987 A | 1/2000 | Barnett |
| 6,052,610 A | 4/2000 | Koch |
| 6,161,032 A | 12/2000 | Acker |
| 6,235,038 B1 | 5/2001 | Hunter |
| 6,248,074 B1 | 6/2001 | Ohno |
| 6,301,495 B1 | 10/2001 | Gueziec |
| 6,370,420 B1 | 4/2002 | Kraft |
| 6,432,041 B1 | 8/2002 | Taniguchi |
| 6,611,141 B1 | 8/2003 | Schulz |
| 6,618,612 B1 | 9/2003 | Acker |
| 6,661,571 B1 | 12/2003 | Shioda |
| 6,690,960 B2 | 2/2004 | Chen |
| 7,043,961 B2 | 5/2006 | Pandey |
| 7,346,417 B2 | 3/2008 | Lüth |
| 7,474,327 B2 | 1/2009 | Davidson |
| 7,491,198 B2 | 2/2009 | Kockro |
| 8,067,726 B2 | 11/2011 | Groszmann |
| 8,207,863 B2 | 6/2012 | Neubauer |
| 9,208,561 B2 * | 12/2015 | Kruger .............. G06K 9/00624 |
| 9,333,047 B2 | 5/2016 | Mucha |
| 9,410,802 B2 | 8/2016 | Mucha |
| 9,471,850 B2 | 10/2016 | Kruger |
| 9,641,808 B2 | 5/2017 | Rose |
| 10,362,966 B2 | 7/2019 | Kruger |
| 10,368,851 B2 | 8/2019 | Tuma |
| 10,398,512 B2 | 9/2019 | Mucha |
| 10,512,522 B2 | 12/2019 | Verard |
| 10,568,713 B2 | 2/2020 | Kruger |
| 11,065,061 B2 | 7/2021 | Makower |
| 11,109,915 B2 | 9/2021 | Mucha |
| 11,123,144 B2 | 9/2021 | Bustan |
| 2001/0021806 A1 | 9/2001 | Gueziec |
| 2003/0040670 A1 | 2/2003 | Govari |
| 2003/0059097 A1 | 3/2003 | Abovitz |
| 2003/0066538 A1 | 4/2003 | Maartinelli |
| 2003/0069588 A1 | 4/2003 | Vilsmeier |
| 2003/0209096 A1 | 11/2003 | Pandey |
| 2003/0229279 A1 | 12/2003 | Amstutz |
| 2003/0231793 A1 | 12/2003 | Crampton |
| 2004/0019274 A1 | 1/2004 | Galloway, Jr. |
| 2004/0024309 A1 | 2/2004 | Ferre |
| 2004/0054489 A1 | 3/2004 | Moctezuma De La Barrera |
| 2004/0073279 A1 | 4/2004 | Malackowski |
| 2004/0143183 A1 | 7/2004 | Toyoda |
| 2004/0169673 A1 | 9/2004 | Crampe |
| 2004/0199072 A1 | 10/2004 | Sprouse |
| 2004/0230199 A1 | 11/2004 | Jansen |
| 2004/0263535 A1 | 12/2004 | Birkenbach |
| 2005/0020909 A1 | 1/2005 | Moctezuma De La Barrera |
| 2005/0024043 A1 | 2/2005 | Govari |
| 2005/0054895 A1 | 3/2005 | Hoeg |
| 2005/0085717 A1 | 4/2005 | Shahidi |
| 2005/0085720 A1 | 4/2005 | Jascob |
| 2005/0101966 A1 | 5/2005 | Lavallee |
| 2005/0107687 A1 | 5/2005 | Anderson |
| 2005/0119639 A1 | 6/2005 | McCombs |
| 2005/0149050 A1 | 7/2005 | Stifter |
| 2005/0187562 A1 | 8/2005 | Grimm |
| 2005/0215854 A1 | 9/2005 | Ozaki |
| 2005/0228270 A1 | 10/2005 | Lloyd |
| 2005/0228274 A1 | 10/2005 | Boese |
| 2005/0288576 A1 | 12/2005 | Febert |
| 2006/0033679 A1 | 2/2006 | Gunji |
| 2006/0058604 A1 | 3/2006 | Avinash |
| 2006/0100526 A1 | 5/2006 | Yamamoto |
| 2006/0122497 A1 | 6/2006 | Glossop |
| 2006/0161059 A1 | 7/2006 | Wilson |
| 2006/0211914 A1 | 9/2006 | Hassler |
| 2006/0241397 A1 | 10/2006 | Govari |
| 2006/0264749 A1 | 11/2006 | Weiner |
| 2006/0271056 A1 | 11/2006 | Terill-Grisoni |
| 2007/0034731 A1 | 2/2007 | Falco |
| 2007/0070194 A1 | 3/2007 | Abe |
| 2007/0106114 A1 | 5/2007 | Sugimoto |
| 2007/0111726 A1 | 5/2007 | Lambert |
| 2007/0135803 A1 | 6/2007 | Belson |
| 2007/0167754 A1 | 7/2007 | Okuno |
| 2007/0182729 A1 | 8/2007 | Klingenbeck-regn |
| 2007/0197896 A1 | 8/2007 | Moll |
| 2007/0287905 A1 | 12/2007 | Klingenbeck-Regn |
| 2008/0009697 A1 | 1/2008 | Haider |
| 2008/0021317 A1 | 1/2008 | Sumanaweera |
| 2008/0071142 A1 | 3/2008 | Gattani |
| 2008/0077158 A1 | 3/2008 | Haider |
| 2008/0103509 A1 | 5/2008 | Goldbach |
| 2008/0121703 A1 | 5/2008 | Li |
| 2008/0132932 A1 | 6/2008 | Hoeppner |
| 2008/0139916 A1 | 6/2008 | Maier |
| 2008/0162074 A1 | 7/2008 | Schneider |
| 2008/0204000 A1 | 8/2008 | Groszmann |
| 2008/0218588 A1 | 9/2008 | Stetten |
| 2008/0221442 A1 | 9/2008 | Tolkowsky |
| 2008/0228188 A1 | 9/2008 | Birkbeck |
| 2008/0228195 A1 | 9/2008 | von Jako |
| 2008/0255442 A1 | 10/2008 | Ashby |
| 2008/0262345 A1 | 10/2008 | Fichtinger |
| 2008/0275334 A1 | 11/2008 | Berting |
| 2008/0287802 A1 | 11/2008 | Li |
| 2008/0294034 A1 | 11/2008 | Krueger |
| 2008/0319448 A1 | 12/2008 | Lavallee |
| 2009/0030428 A1 | 1/2009 | Omori |
| 2009/0068620 A1 | 3/2009 | Knobel |
| 2009/0069671 A1 | 3/2009 | Anderson |
| 2009/0154293 A1 | 6/2009 | Sengupta |
| 2009/0192519 A1 | 7/2009 | Omori |
| 2009/0228813 A1 | 9/2009 | Sekiguchi |
| 2009/0234329 A1 | 9/2009 | Inamoto |
| 2009/0306499 A1 | 12/2009 | Van Vorhis |
| 2010/0019918 A1 | 1/2010 | Avital |
| 2010/0121174 A1 | 5/2010 | Osadchy et al. |
| 2010/0137707 A1 | 6/2010 | Hunter |
| 2010/0160771 A1 | 6/2010 | Gielen |
| 2010/0210939 A1 | 8/2010 | Hartmann |
| 2010/0220914 A1 | 9/2010 | Iwase |
| 2010/0228117 A1 | 9/2010 | Hartmann |
| 2010/0229118 A1 | 9/2010 | Dorn |
| 2010/0234724 A1 | 9/2010 | Jacobson |
| 2010/0249506 A1 | 9/2010 | Prisco |
| 2010/0307516 A1 | 12/2010 | Neubauer et al. |
| 2010/0312247 A1 | 12/2010 | Tuma |
| 2011/0015523 A1 | 1/2011 | Sabata |
| 2011/0054449 A1 | 3/2011 | Tien |
| 2011/0060213 A1 | 3/2011 | Mire |
| 2011/0066029 A1 | 3/2011 | Lyu |
| 2011/0118557 A1 | 5/2011 | McKenna |
| 2011/0137156 A1 | 6/2011 | Razzaque |
| 2011/0178389 A1 | 7/2011 | Kumar |
| 2011/0270083 A1 | 11/2011 | Shen |
| 2011/0288600 A1 | 11/2011 | Ritchey |
| 2011/0295329 A1 | 12/2011 | Fitz |

(56) References Cited

U.S. PATENT DOCUMENTS

| | | |
|---|---|---|
| 2012/0007747 A1 | 1/2012 | Boike |
| 2012/0136626 A1 | 5/2012 | Mucha |
| 2012/0143050 A1 | 6/2012 | Heigl |
| 2012/0157887 A1 | 6/2012 | Fanson |
| 2012/0165655 A1 | 6/2012 | Mucha |
| 2012/0168587 A1 | 7/2012 | Karsak |
| 2012/0188352 A1 | 7/2012 | Wittenberg |
| 2013/0023730 A1 | 1/2013 | Kitamura |
| 2013/0060146 A1 | 3/2013 | Yang |
| 2013/0060278 A1 | 3/2013 | Bozung |
| 2013/0211763 A1 | 8/2013 | Mucha |
| 2013/0258079 A1 | 10/2013 | Rose |
| 2014/0005555 A1 | 1/2014 | Tesar |
| 2014/0051922 A1 | 4/2014 | Guthart |
| 2014/0148808 A1 | 5/2014 | Inkpen |
| 2014/0200621 A1 | 7/2014 | Malackowski |
| 2014/0275987 A1 | 9/2014 | Bzostek |
| 2014/0303489 A1 | 10/2014 | Meier |
| 2014/0314297 A1 | 10/2014 | Krueger |
| 2014/0317910 A1 | 10/2014 | Govari |
| 2015/0087968 A1 | 3/2015 | Kruger |
| 2015/0170366 A1 | 6/2015 | Kruger |
| 2015/0182297 A1 | 7/2015 | Sandhu |
| 2016/0100899 A1 | 4/2016 | Jinno |
| 2016/0106338 A1 | 4/2016 | Kruger |
| 2016/0143700 A1 | 5/2016 | Kruger |
| 2016/0175543 A1 | 6/2016 | Frankhouser |
| 2016/0213430 A1 | 7/2016 | Mucha |
| 2016/0249986 A1 | 9/2016 | Krüger |
| 2016/0310041 A1 | 10/2016 | Jenkins |
| 2016/0331269 A1 | 11/2016 | Kruger |
| 2017/0105809 A1 | 4/2017 | Kruger |
| 2017/0196508 A1 | 7/2017 | Hunter |
| 2017/0258526 A1* | 9/2017 | Lang .............. A61B 17/155 |
| 2017/0270678 A1* | 9/2017 | Masumoto .......... G06T 7/33 |
| 2018/0021092 A2 | 1/2018 | Tausch |
| 2019/0015644 A1 | 1/2019 | Thompson |
| 2019/0038366 A1 | 2/2019 | Johnson |
| 2019/0099141 A1* | 4/2019 | Garlow ............ A61B 6/4447 |

FOREIGN PATENT DOCUMENTS

| | | |
|---|---|---|
| CN | 102917647 A | 2/2013 |
| DE | 19641720 A1 | 4/1998 |
| DE | 19944981 A1 | 4/2001 |
| DE | 202 20 584 U1 | 4/2004 |
| DE | 10 2004 058272 | 6/2005 |
| DE | 10 2004 017834 | 11/2005 |
| DE | 69732362 T2 | 3/2006 |
| DE | 10 2006 052 886 A1 | 5/2007 |
| DE | 2020 07004507 U1 | 6/2007 |
| DE | 10 2006 003 610 | 8/2007 |
| DE | 10 2007 059691 A1 | 7/2008 |
| DE | 10 2008 057744 A1 | 5/2010 |
| DE | 10 2009 030731 | 12/2010 |
| DE | 10 2010 027535 A1 | 1/2012 |
| DE | 10 2011 119 073 A1 | 5/2013 |
| EP | 0691663 A1 | 1/1996 |
| EP | 1278458 B1 | 1/2003 |
| EP | 1380266 A1 | 1/2004 |
| EP | 1523951 | 4/2005 |
| EP | 1080695 A1 | 5/2005 |
| EP | 1900336 A1 | 3/2008 |
| EP | 1 915 962 A1 | 4/2008 |
| EP | 1925265 B1 | 1/2010 |
| EP | 2179703 A1 | 4/2010 |
| EP | 2186474 A1 | 5/2010 |
| EP | 2305115 A1 | 11/2011 |
| EP | 3506278 A1 | 7/2019 |
| JP | 2004-529679 | 9/2004 |
| JP | 2011-036600 | 2/2011 |
| WO | WO 1996/05768 A1 | 2/1996 |
| WO | WO 1997/29678 A2 | 8/1997 |
| WO | WO 1999/32033 A1 | 7/1999 |
| WO | WO 2002/076302 A2 | 10/2002 |
| WO | WO 2005/039391 A2 | 5/2005 |
| WO | WO 2006/095027 A1 | 9/2006 |
| WO | WO 2006/122001 A2 | 11/2006 |
| WO | WO 2007/011314 A2 | 1/2007 |
| WO | WO 2007/017642 A1 | 2/2007 |
| WO | WO 2007/115825 A1 | 10/2007 |
| WO | WO 2008/030263 A1 | 3/2008 |
| WO | WO 2008/076079 A1 | 6/2008 |
| WO | WO 2008/095068 A1 | 8/2008 |
| WO | WO 2008/110553 A2 | 9/2008 |
| WO | WO 2009/150564 A3 | 12/2009 |
| WO | WO 2010/054645 A2 | 5/2010 |
| WO | WO 2010/054646 A3 | 5/2010 |
| WO | WO 2010/076676 A1 | 7/2010 |
| WO | WO 2010/123858 A2 | 10/2010 |
| WO | WO 2010/133320 A1 | 11/2010 |
| WO | WO 2011/081690 A1 | 7/2011 |
| WO | WO 2011/134083 A1 | 11/2011 |
| WO | WO 2011/148299 A1 | 12/2011 |
| WO | WO 2012/056034 A1 | 5/2012 |
| WO | WO 2012/109760 A1 | 8/2012 |
| WO | WO 2012/150567 A1 | 11/2012 |
| WO | WO 2013/010138 A2 | 1/2013 |
| WO | WO 2013/013718 A1 | 1/2013 |
| WO | WO-2013/072434 A1 | 5/2013 |
| WO | WO 2013/109527 A1 | 7/2013 |
| WO | WO 2013/144334 A1 | 10/2013 |
| WO | WO 2014/184382 A1 | 11/2014 |
| WO | WO 2015/085011 A1 | 6/2015 |
| WO | WO 2017/100180 A1 | 6/2017 |
| WO | WO 2021/048439 A1 | 3/2021 |

OTHER PUBLICATIONS

Tsai et al. "A New Technique for Fully Autonomous and Efficient 3D Robotics Hand/Eye Calibration", IEEE Transactions on Robotics and Automation, IEEE, Jun. 1, 1989. (Year: 1989).*
Anonymous, Inertial navigation system, Mar. 8, 2019, Retrieved from the Internet: https://en.wikipedia.org/w/index.php?title=Inertial_navigation_system&oldid=886755750 XP055599140 [retrieved on Jun. 25, 2019].
Anonymous, 3D Reconstruction of the Operating Field for Image Overlay in 3D-Endoscopic Surgery, Proceedings IEEE and ACM International Symposium on Augmented Reality, Oct. 29-30, 2001, 1 page.
Anonymous, 3D Recondruction of the Operating Field for Image Overlay in 3D-Endoscopic Surgery, Nov. 2001, 1 page.
Anonymous, Change System/Upgrade order 1110000092: Overview, Mar. 14, 2008, 1 page.
Anonymous, Configuration ZSY 11100000864: Result, Sep. 25. 2008, 1 page.
Anonymous, Configuration ZSY 11100000864: Result, Aug. 14, 2008, 1 page.
Anonymous, Figure 3, 1 page.
Bockholt, et al., Augmented Reality for Enhancement of Endoscopic Interventions, Proceedings of the IEEE Virtual Reality, 2003, 5 pages.
Brainlab AG, Curve Dual Navigation Station—Technical User Guide Revision 1.1, Dec. 31, 2017 Retrieved from the Internet: https://userguides.brainlab.com/wp-content/uploads/2019/12/Curve-1.2-Technical-User-Guide-English-60915-69EN-Rev.l.1.pdf.
Brainlab AG, Bod de Livraison, Aug. 5, 2008, 2 pages.
Brainlab AG, Lieferschein, Sep. 22, 2008, 2 pages.
Brainlab AG, Acceptance Protocol IGS, 1 page.
Brainlab AG, Clinical User Guide, VectorVision cranial/ENT, Version 7.8, 2008, 594 pages.
Dang, et al., Robust methods for automatic image-to-world registration in cone-beam CT interventional guidance; Medical Physics, AIP; vol. 39, No. 10; Oct. 2012; pp. 6484-6498.
Devernay, Toward Endoscopic Augmented Reality for Robotically Assisted Minimally Invasive Cardiac Surgery, Feb. 2001, 6 pages.
European Patent Office, International Search Report and Written Opinion for PCT/EP2013/056802, dated Jul. 12, 2013, 12 pages.
European Patent Office, International Search Report and Written Opinion for PCT/EP2014/072282, dated Jan. 27, 2015, 12 pages.

(56) References Cited

OTHER PUBLICATIONS

European Patent Office, International Search Report and Written Opinion for PCT/EP2014/073493, dated Jan. 20, 2015, 12 pages.
European Patent Office, International Search Report and Written Opinion for PCT/EP2010/003822, dated Sep. 10, 2010, 13 pages.
European Patent Office, International Search Report and Written Opinion for PCT/EP2015/058107, dated Oct. 22, 2015, 10 pages.
European Patent Office, International Search Report and Written Opinion for PCT/EP2010/002991, dated Sep. 6, 2010, 11 pages.
European Patent Office, International Search Report and Written Opinion for PCT/EP2011/069065, dated Dec. 23, 2011, 8 pages.
European Patent Office, International Search Report and Written Opinion for PCT/EP2020/059643, dated May 12, 2020, 14 pages.
European Patent Office, International Search Report and Written Opinion for PCT/EP2014/068447, dated Feb. 5, 2015, 14 pages.
European Patent Office, International Search Report and Written Opinion for PCT/EP2011/003563, dated Nov. 14, 2014, 12 pages.
European Patent Office, International Search Report and Written Opinion for PCT/EP2014/065030, dated Oct. 8, 2014, 12 paqes.
European Patent Office, International Search Report and Written Opinion for PCT/EP2020/062086, dated Aug. 7, 2020, 10 pages.
European Patent Office, International Search Report and Written Opinion for PCT/EP2012/072783, dated Feb. 13, 2013, 10 paqes.
European Patent Office, European Extended Search Report for EP 19169312.6, dated Jul. 3, 2019, 12 pages.
Fleig, et al., Surface Reconstruction of the Surgical Field from Stereoscopic Microscope Views in Neurosurgery, International Congress Series 1230, 2001, pp. 268-274.
Fusaglia, et al., Endoscopic Image Overlay for the Targeting of Hidden Anatomy in Laparoscopic Visceral Surger, 2013, pp. 9-21.
Hirai, et al., Image-Guided Neurosurgery System Integrating AR-Based Navigation and Open-MRI monitoring, Computer Aided Surgery, Mar. 2005, pp. 59-71, vol. 10, No. 2.
Jain, Fundamentals of Digital Image Processing, Prentice-Hall Inc., 1989, 4 pages.
Jing et al., Navigating System for Endoscopic Sinus Surgery Based on Augmented Reality, IEEE/ICME International Conference on Complex Medical Engineering, 2007, pp. 185-188.
Lapeer, et al., Image-enhanced Surgical Navigation for Endoscopic Sinus Surgery: Evaluating Calibration, Registration and Tracking, The International Journal of Medica Robotics and Computer Assisted Surgery, 2008, pp. 32-45, Nol. 4.
Kawamata, et al., Endoscopic Augmented Reality Navigation System for Endonasal Transsphenoidal Surgery to Treat Pituitary Tumors: Technical Note, Neurosurgery, Jun. 2002, pp. 1393-1397, vol. 50, No. 6.
Konishi et al., Augmented reality navigation system for endoscopic surgery based on three-dimensional ultrasound and computed tomography: Application to 20 clinical cases, International Congress Series 1281, 2005, pp. 537-542. This paper pertains to a medical navigation system which uses an endoscope augmented with 3-D ultrasound and CT scan.
Lee et al., A Simple and Accurate Camera-Sensor Calibration for Surgical Endoscopes and Microscopes, International Conference on Computer Analysis of Images and Patterns, CAIP 2017, [Lecture Notes in Computer Science], Sep. 14, 2014, pp. 98-107.
Maurer et al., Registration of Head Volume Images Using Implantable Fiducial Markers, IEEE Transactions on Medical Imaging 16.4 (1997): 447-462.
Maintz et al.; A Survey of Medical Image Registration, Medical Image Analysis, Oxford University Press, Oxford, GB; Bd. 2, nr. 1; Jan. 1, 1998; whole document.
Mucha et al., Plausibility check for error compensation in electromagnetic navigation in endoscopic sinus surgery, Int. J. of Computer Assisted Radiology and Surgery (CARS), 2006, pp. 316-318.
Olwal, et al., HybridSurface: Multi-user, multi-device, remote collaboration; Vimeo; https://vimeo.com/30581634; 2009; screen shots of video at five second intervals; entire video.
Olwal, et al., Design and Evaluation of Interaction Technology for Medical Team Meetings; Interact 2011, Part 1; FIP International Federation for Information Processing 2011; 2011; pp. 505-522.
Paul, et al., Augmented Virtuality Based on Stereoscopic Reconstruction in Multimodal Image-Guided Neurosurgery: Methods and Performance Evaluation, Methods and Performance Evaluation, IEEE Transactions on Medical Imaging, 2005, pp. 1500-1511, vol. 24.
Rogalla, et al., Virtual Endoscopy and Related 3D Techniques, Medical Radiology Diagnostic Imaging, 2001, 8 pages.
Sielhorst, et al., Advanced Medical Displays: A Literature Review of Augmented Reality, Journal of Display Technology, Dec. 2008, pp. 451-467, vol. 4, No. 4.
Thormahlen, Professor bio, 9 pages.
Thormahlen, Three-Dimensional Endoscopy, Kluwer Academic Publishers, Dec. 2002, pp. 199-214.
United States Patent and Trademark Office, Non-Final Office Action for U.S. Appl. No. 14/903,381, dated Jul. 3, 2019, 20 pages.
United States Patent and Trademark Office, Non-Final Office Action for U.S. Appl. No. 14/387,722, dated Aug. 25, 2017, 11 pages.
United States Patent and Trademark Office, Non-Final Office Action for U.S. Appl. No. 14/387,722, dated Apr. 13, 2018, 22 pages.
United States Patent and Trademark Office, Final Office Action for U.S. Appl. No. 14/387,722, dated Dec. 28, 2018, 26 pages.
United States Patent and Trademark Office, Non-Final Office Action for U.S. Appl. No. 14/387,722, dated May 23, 2019, 24 pages.
United States Patent and Trademark Office, Final Office Action for U.S. Appl. No. 14/387,722, dated Dec. 31, 2019, 23 pages.
United States Patent and Trademark Office, Final Office Action for U.S. Appl. No. 14/387,722, dated Jun. 30, 2021, 27 pages.
United States Patent and Trademark Office, Non-Final Office Action for U.S. Appl. No. 14/903,381, dated Dec. 28, 2017, 18 pages.
United States Patent and Trademark Office, Final Office Action for U.S. Appl. No. 14/903,381, filed Jun. 20, 2018, 19 pages.
United States Patent and Trademark Office, Non-Final Office Action for U.S. Appl. No. 14/903,381, dated Feb. 7, 2019, 21 pages.
United States Patent and Trademark Office, Final Office Action for U.S. Appl. No. 14/903,381, dated Jul. 3, 2019, 20 pages.
United States Patent and Trademark Office, Non-Final Office Action for U.S. Appl. No. 14/903,381, dated Jan. 8, 2020, 17 pages.
United States Patent and Trademark Office, Final Office Action for U.S. Appl. No. 14/903,381, dated Jun. 23, 2020, 17 pages.
United States Patent and Trademark Office, Non-Final Office Action for U.S. Appl. No. 14/903,381, dated Nov. 24, 2020, 17 pages.
United States Patent and Trademark Office, Final Office Action for U.S. Appl. No. 14/903,381, dated May 5, 2021, 21 pages.
United States Patent and Trademark Office, Non-Final Office Action for U.S. Appl. No. 15/033,146, dated Aug. 27, 2018, 16 pages.
United States Patent and Trademark Office, Final Office Action for U.S. Appl. No. 15/033,146, dated Mar. 7, 2019, 12 pages.
United States Patent and Trademark Office, Non-Final Office Action for U.S. Appl. No. 15/033,146, dated Sep. 19, 2019, 15 pages.
United States Patent and Trademark Office, Final Office Action for U.S. Appl. No. 15/033,146, dated Apr. 16, 2020, 14 pages.
United States Patent and Trademark Office, Non-Final Office Action for U.S. Appl. No. 15/033,146, dated Sep. 30, 2020, 13 pages.
United States Patent and Trademark Office, Final Office Action for U.S. Appl. No. 15/033,146, dated Jul. 28, 2021, 21 pages.
United States Patent and Trademark Office, Final Office Action for U.S. Appl. No. 17/492,057, filed Dec. 9, 2021, 14 pages.
United States Patent and Trademark Office, Non-Final Office Action for U.S. Appl. No. 13/881,770, dated Jun. 18, 2015, 18 pages.
United States Patent and Trademark Office, Final Office Action for U.S. Appl. No. 13/881,770, dated Nov. 20, 2015, 20 pages.
United States Patent and Trademark Office, Notice of Allowance for U.S. Appl. No. 13/881,770, dated Jan. 20, 2017, 8 pages.
United States Patent and Trademark Office, Notice of Allowance for U.S. Appl. No. 14/401,652, dated Sep. 1, 2015, 13 pages.
United States Patent and Trademark Office, Non-Final Office Action for U.S. Appl. No. 14/890,480, dated Jan. 27, 2017, 20 pages.
United States Patent and Trademark Office, Final Office Action for U.S. Appl. No. 14/890,480, dated Aug. 4, 2017, 21 pages.

(56) References Cited

OTHER PUBLICATIONS

United States Patent and Trademark Office, Non-Final Office Action for U.S. Appl. No. 14/890,480, dated Mar. 8, 2018, 20 pages.
United States Patent and Trademark Office, Final Office Action for U.S. Appl. No. 14/890,480, dated Aug. 30, 2018, 22 pages.
United States Patent and Trademark Office, Notice of Allowance for U.S. Appl. No. 14/890,480, dated Apr. 9, 2019, 8 pages.
United States Patent and Trademark Office, Non-Final Office Action for U.S. Appl. No. 15/303,793, dated Apr. 23, 2018, 31 pages.
United States Patent and Trademark Office, Final Office Action for U.S. Appl. No. 15/303,793, dated Nov. 16, 2018, 33 pages.
United States Patent and Trademark Office, Non-Final Office Action for U.S. Appl. No. 15/303,793, dated Jun. 13, 2019, 52 pages.
United States Patent and Trademark Office, Notice of Allowance for U.S. Appl. No. 15/303,793, dated Oct. 18, 2019, 8 pages.
United States Patent and Trademark Office, Non-Final Office Action for U.S. Appl. No. 14/358,108, dated Jun. 12, 2015, 10 pages.
United States Patent and Trademark Office, Final Office Action for U.S. Appl. No. 14/358,108, dated Jan. 29, 2016, 12 pages.
United States Patent and Trademark Office, Notice of Allowance for U.S. Appl. No. 14/358,108, dated Jun. 15, 2016, 8 pages.
United States Patent and Trademark Office, Non-Final Office Action for U.S. Appl. No. 13/321,087, dated Apr. 22, 2015, 11 pages.
United States Patent and Trademark Office, Final Office Action for U.S. Appl. No. 13/321,087, dated Oct. 21, 2015, 12 pages.
United States Patent and Trademark Office, Non-Final Office Action for U.S. Appl. No. 13/321,087, dated Dec. 9, 2016, 20 pages.
United States Patent and Trademark Office, Final Office Action for U.S. Appl. No. 13/321,087, dated Sep. 21, 2017, 18 pages.
United States Patent and Trademark Office, Non-Final Office Action for U.S. Appl. No. 13/321,087, dated Jul. 13, 2018, 24 pages.
United States Patent and Trademark Office, Notice of Allowance for U.S. Appl. No. 13/321,087, dated Apr. 26, 2019, 5 pages.
United States Patent and Trademark Office, Non-Final Office Action for U.S. Appl. No. 13/380,695, dated Dec. 4, 2013, 9 pages.
United States Patent and Trademark Office, Final Office Action for U.S. Appl. No. 13/380,695, dated Jul. 16, 2014, 11 pages.
United States Patent and Trademark Office, Non-Final Office Action for U.S. Appl. No. 13/380,695, dated Dec. 9, 2014, 6 pages.
United States Patent and Trademark Office, Final Office Action for U.S. Appl. No. 13/380,695, dated Jul. 29, 2015, 5 pages.
United States Patent and Trademark Office, Notice of Allowance for U.S. Appl. No. 13/380,695, dated Feb. 17, 2016, 8 pages.
United States Patent and Trademark Office, Non-Final Office Action for U.S. Appl. No. 13/810,666, dated Dec. 18, 2015, 8 pages.
United States Patent and Trademark Office, Notice of Allowance for U.S. Appl. No. 13/810,666, dated Apr. 8, 2016, 5 pages.
Von F. Hagenmuller, et al., Medical Imaging in Gastroenterology and Hepatology (Falk Symposium, Band 124), Dec. 2002, 3 pages.
Von F. Hagenmuller, et al., Medical Imaging in Gastroenterology and Hepatology (Falk Symposium, Band 124), [Book Description], 2 pages.
Von F. Hagenmuller, et al., Medical Imaging in Gastroenterology and Hepatology, Kluwer Academic Publishers, 2002, 3 pages.

* cited by examiner

REGISTRATION METHOD AND SETUP

CROSS-REFERENCE TO RELATED APPLICATIONS

This application is a continuation of International Patent Application No. PCT/EP2020/059643, filed Apr. 3, 2020, which claims priority to and the benefit of U.S. Patent Application No. 62/828,638, filed Apr. 3, 2019, each of which is incorporated herein in its entirety.

TECHNICAL FIELD

The invention relates to a registration method and a registration setup for determining position and orientation of an object in relation to a position detection system.

BACKGROUND OF THE INVENTION

Position detection systems which, for example in the medical field, support a navigation of instruments, for example surgical instruments, are known per se. Such position detection systems can be optical, ultrasound-based or electromagnetic position detection systems and serve for detecting position and orientation of a position sensor in relation to the position detection systems.

For example, electromagnetic position detection systems are known, in which a field generator generates an alternating electromagnetic field and provision is made for position sensors comprising coils. A current induced in the coils by the alternating electro-magnetic field depends on the orientation of a respective coil in relation to the alternating electro-magnetic field. If a movable instrument is equipped with such position sensors, e.g., in the form of sensor coils, it is possible to determine place and location of the instrument relative to a reference sensor which, e.g., can likewise comprise coils. Such a reference sensor is preferably rigidly connected to a body part of a patient (or else a different object).

For supporting a surgeon in navigating a surgical instrument inside a patient's body, the position of the surgical instrument having position sensors is typically detected by means of such a position detection system and the position of the instrument is displayed in sectional images of the body part obtained by tomography.

In order for this to work, the position values supplied by the position sensor of the instrument must be transferred into coordinates of the tomographic image of the patient. By way of example, the practice of generating a topographic image of the surface of a body part from a tomographic image of a patient is known, in order to correlate points on the surface of the topographic image (also referred to as model surface below) with those points on the surface of the real body part which are respectively contacted by a pointer instrument or sensing instrument. Thus, a transformation prescription for transforming position values detected by means of the position detection system into model coordinates can be produced within the scope of a registration method. To this end, a plurality of points is sensed on the real surface of the body part and the associated position values, which represent points on a real surface, are correlated with points on the model surface while maintaining their relative position with respect to one another in such a way that this results in the smallest possible error. A transformation prescription specifying how detected position values are to be converted into coordinates of the topographic image—also referred to as topographic model here—and therefore also into coordinates of the tomographic image or model, emerges here from.

The patient registration refers to the establishment of a transformation function for bringing position data detected during the operation into correspondence with position information in image data obtained prior to surgery, for example by tomography. By way of example, for the purposes of patient registration, as described above, a patient model is detected and a transformation function is established which, within the scope of the registration method, brings detected position data and a patient model resulting therefrom into correspondence with position information relating to the image data obtained prior to surgery.

For the purposes of determining the transformation function, so called registration, the same geometric features in the model and in the image data (for example obtained by tomography) are established in the respective coordinate system. The two coordinate systems are then correlated by means of these features. The surface registration by means of a pointer instrument is generally widespread. Here, the skin surface of the patient serves as corresponding feature. The skin surface is sensed by means of a pointer instrument during surgery and brought into correspondence with the extracted skin surface from the image data.

Also non-tactile registration methods have been described.

A non-tactile registration method as described in U.S. Pat. No. 9,208,561 B2 to register patient image data makes use of an image sensor unit (monofocal camera or 3D-camera) as a reference sensor. The image sensor unit produces a surface model of the skin surface, detects a reference sensor optically and relates its position to the skin surface model. Since the reference sensor is also tracked by the position detection system, the transformation of skin surface model points from the coordinate system of the surface model into the coordinate system of the position detection system can be determined and with this the registration to the patient image data calculated.

Another non-tactile registration method makes use of a structured light or laser emitter/receiver unit that is rigidly combined with an optical position detection system. Optical position detection systems often comprise a light emitter/receiver unit and position sensors that are configured to reflect light emitted by the light emitter/receiver unit. The emitter/receiver unit then detects the reflected light from which position and orientation of the position sensor can be obtained. This way a surface model, generated by the structured light or laser emitter/receiver unit is known in the coordinate system of the optical position detection system.

SUMMARY OF THE INVENTION

It is an object of the invention to provide an improved non-tactile registration method and an improved registration setup.

Regarding the registration method this object is achieved by a registration method for determining position and orientation of an object in relation to a position detection system, wherein the method comprises the steps of
    capturing an image of a surface of an object with an image sensor unit comprising at least one motion sensor and/or at least one position sensor,
    determining a capturing position of the image sensor unit by processing motion sensor signals provided by said motion sensor and/or position signals provided by said position sensor, photogrammetrically generating a surface model of the object from the captured image, and transforming the photogrammetrically generated surface model into the coordinate system of a position detection system.

Within the framework of this specification the term "capturing position" refers to the position of the image sensor unit at the time of capturing an image of an object. For example, the term "capturing position" refers to the position of an entrance pupil of a camera that is part of the image sensor unit at the time of capturing an image.

Of these steps, the sequence of the steps "capturing an image of a surface of an object with an image sensor unit", "determining a capturing position of the image sensor unit" and "photogrammetrically generating a surface model of the object from the captured image" is of no matter. Accordingly, it is possible to first take an image of the surface of the object and only thereafter determining the capturing position of the image sensor unit. It is even possible to determine the capturing position of the image sensor unit after photogrammetrically generating a surface model of the object. The capturing position of the image sensor unit is, however, needed in order to transform the photogrammetrically generated surface model into the coordinate system of the position detection system. This is explained in more detail hereinafter.

The invention includes the recognition that non-tactile registration methods in general have the advantage that problems emerging in the case of known registration methods by means of a pointer instrument due to e.g. soft skin of a patient possibly deforming during contact with the pointer instrument can be avoided. Moreover, since the optical generation of the surface model allows a larger portion of the surface of a body part or object to be detected simultaneously, the registration can also be performed more quickly and, at the same time, more accurately.

It is preferred to arrange the image sensor unit at a sufficient distance from the surface of the object when capturing the image of the surface. This typically implies that the electromagnetic field of an electromagnetic position detection system is too weak at the capturing position of the image sensor unit for allowing a determination of the image sensor unit's position by means of the electromagnetic position detection system.

A general concept of determining position and orientation of an object in relation to a position detection system can be described as follows:

Preferably, the surface model of the object is photogrammetrically generated by the image sensor unit. The surface model can be represented by a point cloud wherein the coordinates of the points of the point cloud are defined in the surface model's coordinate system. The surface model's coordinate system is an intrinsic coordinate system of the image sensor unit or more precisely of a camera comprised in the image sensor unit. Preferably the surface model's coordinate system is defined such that its origin is at the position of an entrance pupil of a camera of the mage sensor unit.

The points of the point cloud representing the object's surface have coordinates in both, the surface model's coordinate system and the position detection system's coordinate system.

By photogrammetrically generating the surface model from a captured image initially the coordinates of the points of the point cloud are obtained in the surface model's coordinate system. The coordinates representing these points of the point cloud in the position detection system's coordinate system can be obtained by way of transformation.

In order to carry out such transformations, a transformation function can be employed for transforming the respective coordinates of points of the point cloud defined in the surface model's coordinate system into coordinates in the coordinate system of the position detection system. A transformation function can comprise or can be represented by a transformation matrix.

In order to obtain the transformation function for transforming coordinates of the image sensor unit's coordinate system into coordinates of the position detection systems' coordinate system, the position and orientation of the image sensor unit at the moment of capturing the image is needed. This is because the image sensor unit's coordinate system is centred on the image sensor unit and on the image sensor unit's entrance pupil in particular.

The position of the image sensor unit, i.e. the capturing position, in terms of coordinates of the position detection system can be obtained by means of a sensor, e.g. a motion sensor or a position sensor, that is arranged on the image sensor unit. Typically, such sensor has an offset with respect to the image sensor unit's entrance pupil. Thus, the image sensor unit's coordinate system with the capturing position at its origin has an offset to the coordinate system of a motion sensor and/or position sensor in which the coordinate of the capturing position is defined by a non-trivial vector. Such offset (i.e. a vector) can be determined by way of calibration and can be expressed in terms of coordinates of the image sensor unit's coordinate system or in terms of coordinates of a sensor's coordinate system of the sensor that is arranged on the image sensor unit. Hence, by means of calibration the coordinate of the capturing position in the coordinate system of the motion sensor and/or position sensor can be determined. The image sensor unit's coordinate system can then be "attached" with its origin (that is the capturing position in the surface model's coordinate system) to the coordinate of the capturing position in the coordinate system of the motion sensor and/or position sensor.

Thereby, coordinates in the surface model's coordinate system representing points of the point cloud of the surface model can be transformed via a coordinate system of a motion sensor or position sensor into the coordinate system of the position detection system.

In the following preferred variants of the registration method according to the invention are described.

If the image sensor unit comprises a position sensor, translations and rotations of the image sensor unit can be determined by detecting position and orientation of the position sensor.

Thus, the coordinates of the capturing position in the position sensor's coordinate system and the orientation thereof can be directly determined in the coordinate system of the position detection system. From the orientation of the position sensors coordinate system a rotation of the image sensor unit can be determined.

If the image sensor unit solely comprises a motion sensor (and no position sensor), translations and rotations of the image sensor unit can indirectly be determined in relation to the position detection system. One way of enabling an indirect determination of position and orientation of the image sensor unit is to move the image sensor unit along a path from or to a position whose coordinate is known in the coordinate system of the position detection system. Points on the path of the motion sensor can be correlated to this known position in the position detection system's coordinate system. Translations and rotations of the image sensor unit can thus be determined by detecting position and orientation of a motion sensor's coordinate system relative to the position detection system's coordinate system.

Thereby, position and orientation of the motion sensor's coordinate system in relation to the position detection system's coordinate system can be determined. By calibrating the motion sensor to the position of the entrance pupil the coordinate of the capturing position in the motion sensor's coordinate system can be determined. From this the coordinate of the capturing position in the detection system's coordinate system can be determined.

The coordinate system of motion sensor and/or position sensor has a fixed relation to the surface model's coordinate system as relative distance and orientation between a camera of the image sensor unit and a motion sensor and/or position sensor arranged on the image sensor unit stay constant. Therefore, a calibration vector can be determined representing an offset between the surface model's coordinate system and the coordinate system of the motion sensor and/or position sensor. This can be done by calibrating the camera, e.g., the position of the entrance pupil of the camera to the motion sensor and/or position sensor. Calibrating can include determining transformation functions between the surface model's coordinate system and the coordinate system of the motion sensor or position sensor. Thereby a respective coordinate of the capturing potion in the coordinate system of the motion sensor and/or position sensor can be determined.

In particular, if the image sensor unit is located relatively close to the position detection system, the capturing position can be determined by using a position sensor attached to the image sensor unit, which can be located with the position detection system to localize the position and orientation of the image sensor unit. After calibrating the position sensor to the position of the entrance pupil of the image sensor unit, a coordinate of the determined capturing position in the coordinate system of the position sensor can be transformed into the coordinate system of the position detection system. In these embodiments, position and orientation of the image sensor unit can be directly tracked with an electromagnetic or optical position detection system. Using a position sensor alone for determining the capturing position of the image sensor unit does, however, not allow determining a capturing position where an electromagnetic field of an electromagnetic position detection system is too weak, i.e. outside a working space of a position detection system.

Accordingly, it is beneficial if in some of these embodiments in which the image sensor unit comprises a position sensor that the image sensor unit further comprises a motion sensor. If the image sensor unit comprises both, a position sensor and a motion sensor, the position sensor can be used, e.g., to determine a starting position of a user chosen path along which the image sensor unit is moved. The path along which the image sensor unit is moved can then be tracked with either the position sensor or the motion sensor or with both sensors.

Alternatively or additionally, the capturing position can also be determined by using a position sensor for detecting position and orientation in the coordinate system of the position detection system that is localized from the image sensor unit. Such a reference position sensor can be attached to the object itself or placed at a relative distance to the object such that when capturing an image of the object the reference position sensor is visible in that image together with the object. The reference position sensor then provides reference in that image to a coordinate in the coordinate system of the position detection system thus allowing to correlate points on the surface model to coordinates in the coordinate system of the position detection system. Thereby, a coordinate of any point of the surface model can be transformed into a respective coordinate in the coordinate system of the position detection system. This approach can also be combined with embodiments of the registration method in which the image sensor unit comprises a position sensor and/or a motion sensor.

Alternatively or additionally, the capturing position can also be determined by fixing the image sensor unit to a pre-defined position, e.g., defined by the position of an image sensor unit holder, that is known in the coordinate system of the position detection system. A pre-defined position can also be defined by mounting the image sensor unit directly to a field generator of an electromagnetic position detection system. With the image sensor unit being fixed to the pre-defined position whose coordinate is known in the position detection system's coordinate system an image can be captured. The capturing position can then be calibrated to a pre-defined position, e.g. the position of a position sensor comprised in the holder. The coordinate of the capturing position in the coordinate system of the position detection system can then be determined. An image sensor unit that is fixed to a pre-defined position can also comprise a position sensor and/or a motion sensor itself. The image can also be captured such that a reference position sensor attached to or placed relative to the object is visible on a captured image together with the object.

In various embodiments of the registration method according to the invention and in particular also in such embodiments of the registration in which the image sensor unit comprises a position sensor the registration method can comprises the step of providing at least one image sensor unit comprising at least one motion sensor for detecting a linear acceleration and/or rotational rate over time independent of the position detection system.

In some embodiments from these various embodiments in which the image sensor unit comprises a motion sensor the step of "determining a capturing position of the image sensor unit" comprises the sub-steps of moving the image sensor unit along a spatial path relative to a position detection system, recording said path of the image sensor unit by processing motion sensor signals provided by the motion sensor, relating at least one point of said determined path to a coordinate in the coordinate system of the position detection system, and determining the capturing position of the image sensor unit based on the determined path and the known spatial relation of the at least one point on the determined path and said coordinate.

These sub-steps refer to determining the position of the image sensor unit while moving said image sensor unit relative to the position detection system. These sub-steps can be performed before an image is captured or after an image has been captured.

The path along which the image sensor unit is moved can be chosen by the user, i.e., there is no need to follow a certain, predetermined path.

The sub-steps of relating at least one point of said determined path to a coordinate in the coordinate system of the position detection system, and determining a capturing position of the image sensor unit at which an image of the object is captured based on the determined path and the known spatial relation of the at least one point on the determined path and said coordinate serve for determining position and orientation of the recorded path in the coordinate system of the position detection system. In particular, the sub-step of relating at least one point of said determined path to a coordinate in the coordinate system of the position detection system works independently of whether or not an image has been captured. It is thus possible that a path of an image sensor unit is recorded without or before having captured an image. However, for determining a capturing position, in particular in the coordinate system of the position detection system, it is required that the path along which the image sensor unit has been moved to the or away from the capturing position is determined and a spatial relation of at least one point on the determined path and a coordinate in the coordinate system of the position detection system is known.

Relating at least one point of said determined path to a coordinate in the coordinate system of the position detection system can be achieved in various ways. It is, for instance, possible to establish a spatial relation between one point of the path to a coordinate of the coordinate-system by moving the image sensor unit along the path from or to a known position in the coordinate system of the position detection system. Once the image sensor unit reaches a position with known coordinates in the coordinate-system of the position detection system, a known spatial relation between the coordinate in the position detection system's coordinate system and at least one point of said determined path is established. When being at the known position the motion sensor can be reset.

The step of photogrammetrically generating a surface model of the object from at least one captured image requires only that an image has been captured and can be performed at any time after the image has been captured.

In various embodiments in which the image sensor unit comprises a motion sensor, but also in other variants of the registration method in which the image sensor unit comprises an additional position sensor the step of "transforming the photogrammetrically generated surface model into the coordinate system of a position detection system" comprises the sub-steps of
relating at least one point of the generated surface model to a coordinate in a coordinate system of the motion sensor and/or position sensor by means of calibration.

For photogrammetry, the entrance pupil (also known as front nodal point) of a camera is typically chosen as reference for a photogrammetric generation of a surface model. The entrance pupil of the image sensor unit has a fixed relative distance and orientation to the motion sensor and/or position sensor comprised in the image sensor unit. This results in an offset between the image sensor unit's coordinate system and the sensor's coordinate system. This offset can be determined by means of calibration.

The capturing position, e.g. the position of the entrance pupil, preferably is set as the origin of the image sensor unit's coordinate system. By determining the offset between the image sensor unit and the position or motion sensor, the capturing position in the coordinate system of the motion sensor and/or position sensor can be determined.

Thereby points of the generated surface model as initially defined by coordinates in the image sensor unit's coordinate system can be related to respective coordinates in the sensor's coordinate system and in turn to respective coordinates in the position detection system's coordinate system.

This sub-step requires that a surface model has been generated and thus an image has been captured. This sub-step can be performed at any time after the surface model has been generated.

Preferably, this sub-step of relating at least one point of the generated surface model to coordinates in a coordinate system of the motion sensor and/or position sensor includes that
transformation functions are determined for transformations of coordinates between the motion sensor's and/or position sensor's coordinate system and the coordinate system of the image sensor unit by means of calibration, and
the coordinate of the capturing position of the image sensor unit is determined in the coordinate system of the motion and/or the position sensor, respectively.

As a result, the coordinate of the capturing position in the coordinate system of the motion sensor and/or position sensor is obtained. As position and orientation of the motion sensor and/or the position sensor and thus the sensor's coordinate system are known (or can be determined) in relation to the position detection system's coordinate system, the coordinates of the capturing position in the position detection system's coordinate system can be determined, too. By using the transformation functions coordinates of the photogrammetrically generated surface model in the surface model's (image sensor unit's) coordinate system can be transformed into the coordinate system of the position detection system.

In particular, with a registration method according to various embodiments in which the image sensor unit comprises a motion sensor, limits of current non-tactile registration methods can be overcome. For example, a non-tactile registration method as described in U.S. Pat. No. 9,208,561 B2 requires that a position sensor for detecting a position and orientation in the coordinate system of the position detection system is coupled to an image sensor unit or is comprised by an image sensor unit. By means of the position sensor position and orientation of the image sensor unit can be determined directly in the coordinate system of the position detection system.

The invention includes the further recognition that such current non-tactile registration methods in which the image sensor unit is coupled to or comprises a position sensor only work if the position sensor can actually be reliably detected by the position detection system. As a result, the application of such non-tactile registration methods is typically limited to a working space of a position detection system. A working space of a position detection system is a space in which, e.g., the optical or electromagnetic field of the position detection system has a certain field strength and is homogeneous enough to reliably determine position and orientation of a position sensor. If, however, the image sensor unit that is coupled to or that comprises a position sensor is at a distance to the position detection system where the working space of the optical or electromagnetic field of a position detection system is rather weak or the working space is rather inhomogeneous, current non-tactile registration methods are expected to lose accuracy and may not be applied in a reliable manner anymore.

With the registration method according to various embodiments in which the image sensor unit comprise at least one motion sensor, it is not required that the image sensor unit itself comprises or is coupled to a position sensor. With a motion sensor or preferably a motion sensor arrangement comprising several motion sensors such as inertial sensors comprised of accelerometers or gyroscopes or also magnetometers linear acceleration and rotational rate of a moving body can be detected. A motion sensor provides motion sensor signals representing the detected linear acceleration and rotational rate over time. Motion sensor signals can be processed, for example integrated, e.g., by a tracking unit, to thus determine a path along which the image sensor unit has been moved. A path along which the image sensor unit moves relative to the position detection system comprises a sequence of locations over time. In particular, this path is a freely chosen path relative to the position detection system. The tracking of the movement of the image sensor unit by means of the motion sensor works independently of the position detection system.

Although the motion sensor works independently of the position detection system, in particular with the non-tactile registration method according to various embodiments in which the image sensor unit comprises at least one motion sensor it is still possible to determine position and orientation of an object in relation to a position detection system. This is achieved because a path along which the image sensor unit moves is recorded by processing motion sensor signals provided by motion sensor and because at least one point of said determined path is related to a coordinate in the coordinate system of the position detection system. Thereby, for at least one point of the determined path a coordinate in the coordinate system of the position detection system can be determined. For determining position and orientation of an object in relation to a position detection system, in particular, the capturing position at which an image of the object is captured by the image sensor unit needs to be determined within the coordinate system of the position detection system. When determining a capturing position of the image sensor unit comprising a motion sensor in the coordinate system of the position detection system at least the determined path of the image sensor unit and the known spatial relation of the at least one point on the determined path and said coordinate have to be known.

Further, the position of the motion sensor or in case of a sensor arrangement the motion sensors have to be calibrated to the entrance pupil of a camera of the image sensor unit. If the image sensor unit comprises more than one camera or if one camera comprises more than one entrance pupil, the several entrance pupils have to be calibrated to each other and to the one or more motion sensors. If further sensors like one or more position sensors are comprised, too, in the image sensor unit, the entrance pupils also have to calibrated to these position sensors. Calibration refers to the determination of transformation functions for transformations between the coordinate systems of two elements, e.g., entrance pupils and/or sensors. These transformation functions typically have to be determined once, as the relative distance and orientation between respective entrance pupils and/or sensor do not change after they have been mounted, e.g., in an image sensor unit.

In this respect it is already stressed, that it is preferred that the image sensor unit comprises a 3-D camera such as an optical stereographic camera or an optical multi camera or a time-of-flight camera.

From the image captured at the capturing position a surface model is photogrammetrically generated. A point of this surface model is then related by means of calibration to a coordinate in the coordinate system of the motion sensor and/or position sensor. This can comprise that transformation functions are determined for transforming a coordinate in the coordinate system of a motion sensor and/or position sensor into a corresponding coordinate in the surface model's coordinate system.

After calibration, a point on the surface model defined in the coordinate system of the surface model can be assigned to a coordinate in the coordinate system of the position detection system. In particular, a point on the surface model defined in the coordinate system of the surface model can be assigned to a coordinate in the coordinate system of the position detection system that has a known spatial relation to at least one point on said path. Such a spatial relation can be established by moving the image sensor unit from or to a position that is known in the coordinate system of the position detection system. After calibration, the generated surface model can be transformed into and, thus, registered to the coordinate system of the position detection system.

With the non-tactile registration method according to the invention and in particular with a registration method according to various embodiments in which the image sensor unit comprises a motion sensor it is possible to determine position and orientation of an object in relation to a position detection system with high precision. Moreover, the registration method can be performed comparatively easy and quick and—in particular with respect to various embodiments in which the image sensor unit comprises a motion sensor—without spatial limitation to a working space of a position detection system. Thus, it is a particular advantage of the registration method that the image sensor unit can be moved relatively freely and independently of the working space of the position detection system while position and orientation of an object in relation to a position detection system can still be determined in a reliable manner. This allows capturing an image of an object at a capturing position that is most suitable therefore. Often the most suitable capturing position may lie outside of a working space of a position detection system and is now reliably accessible.

Preferably the position of the entrance pupil of a camera is calibrated to the position of a sensor that is comprised in the image sensor unit. As position and orientation of the sensor can be determined in relation to the position detection system, a coordinate of the capturing position in the coordinate system of the image sensor unit can be transformed into the position detection system's coordinate system.

The position of the sensor at the time of capturing the image can be a starting or an end point of the path but can also correspond to any other point on the path that lies between a start point and an end point of the trajectory.

The known spatial relation of the at least one point on the determined path and said coordinate in the coordinate system of the position detection system can be a relative distance from the at least one point on the determined path to said coordinate in the coordinate system of the position detection system. Preferably, said coordinate in the coordinate system of the position detection system is a priori known or defined before moving the image sensor unit. For example, if the image sensor unit is moved from or to a position that is known in the coordinate system of the position detection system a known spatial relation between the coordinate in the position detection system's coordinate system and at least one point of said determined path is established. From this known spatial relation and the known orientation of the path in relation to the position detection system any other point on the recorded path can be transformed into the position detection system's coordinate system.

Preferably, by relating at least one point of said determined path to a coordinate in the coordinate system of the position detection system a relative distance from at least one point of the path to a coordinate in the coordinate system of the position detection system as well as the orientation of said path in the coordinate system of the position detection system is obtained. In some embodiments this requires to relate at least two points of said determined path each to a different coordinate in the coordinate system of the position detection system. From a relative distance from at least one point of the determined path to a coordinate in the coordinate system of the position detection system as well as the orientation of the path in the coordinate system of the position detection system the relative distance of any point on the path and in particular the position of the sensor at the time of capturing the image can be determined in the coordinate system of the position detection system.

The registration method according to the invention can be conducted with different position detection systems such as optical, electromagnetic or ultrasound-based position detection systems. However, it is preferred that the registration method according to the invention is conducted with an electromagnetic position detection system.

A coordinate that has a known spatial relation to at least one point on the path can be defined by the position of, e.g., a field generator or a light source of a position detection system itself. The position of, e.g., the field generator can be considered as the origin of the coordinate system spanned by an electromagnetic position detection system. A coordinate that has a known spatial relation to at least one point on the path can also be defined by the position of a position sensor that is located at a distance relative to a field generator or light source, e.g., at a fixed position. Such a position sensor can be attached to the object. A position sensor can also be comprised in an image sensor unit holder for the image sensor unit. A coordinate that has a known spatial relation to at least one point on the path the position sensor comprised in a touch point. An image sensor unit can be moved to and brought into contact with the touch point. When moving the image sensor unit away from the touch point along a path, each point on the path can preferably be correlated to the touch point and in particular the position sensor of the touch point. If the image sensor unit itself comprises a position sensor, a coordinate that has a known spatial relation to at least one point on the path can also be defined by a specific position or recorded path of the position sensor and, thus, the image sensor unit, that is detected within the coordinate system of the position detection system. For example, if the image sensor unit itself additionally comprises a position sensor for detecting position and orientation in the coordinate system of the position detection system, an arbitrary position of the position sensor can be defined as being the coordinate that has a known spatial relation to at least one point on the path. Starting from this coordinate the image sensor unit can be moved along a path that is recorded by processing motion sensor signals provided by the motion sensor.

The surface model of the object that is photogrammetrically generated from at least one captured image can be calculated by the image sensor unit or alternatively by a position determination unit that is part of a respective registration setup.

The object of which an image is captured can be a body part of a patient, e.g., a patient's face.

In some embodiments of various embodiments in which the image sensor unit comprises a motion sensor the image sensor unit is moved along a path that starts at said coordinate of the position that is known in the coordinate system of the position detection system and ends at the position of the sensor at which the image is captured. Preferably, the position of the sensor at which the image is captured is then determined in the coordinate system of the position detection system based on the recorded path and the known spatial relation at least of the starting point of the path and said coordinate.

The coordinate in the coordinate system of the position detection system where the movement of the image sensor unit starts lies within the working space of the position detection system. The image sensor unit can be moved away from this known position even to a position outside the working space. Because the path along which the image sensor unit is moved starts at the known starting position, if the orientation of the path in the coordinate system of the position detection system is known a relative distance from any point on the path to the known starting position can be calculated. This means any point on the path and in particular any sensor position relative to the position detection system at which an image is captured that lies on this path can be determined in the coordinate system of the position detection system. A fraction of the path can lie outside working space and still—because the patch is recorded by processing motion sensor signals provided by the motion sensor—any point on the path lying outside the working space can be determined in the coordinate system of the position detections system, too. In particular, also a capturing position that lies outside the working space of a position detection system can still be determined in the coordinate system of the position detection system.

In some alternative embodiments of various embodiments in which the image sensor unit comprises a motion sensor the path along which the image sensor unit is moved starts at the capturing position and ends at said known coordinate in the coordinate system of the position detection system and the image sensor unit is moved along this path after the image has been captured. Preferably, the capturing position is then determined in the coordinate system of the position detection system based on the recorded path and the known spatial relation at least of the end point of the path and said coordinate.

In these alternative embodiments the steps of moving the image sensor unit and capturing an image are in reversed chronology compared to the previously described embodiments where the image sensor unit is moved along a path that starts at said coordinate in the coordinate system of the position detection system and ends at the capturing position. Both, the previously described embodiments and these alternative embodiments can lead to the same results.

In these alternative embodiments of various embodiments in which the image sensor unit comprises a motion sensor, too, the capturing position can lie outside a working space of a position detection system. However, as the path from the capturing position to the said coordinate in the coordinate system of the position detection system depicting the end point of this path is recorded by processing motion sensor signals provided by motion sensor, if the orientation of the path in the coordinate system of the position detection system is known a relative distance from any point and in particular from the capturing position to the end point can be calculated based on the motion sensor signals after having captured an image.

By moving the image sensor unit to or from a known position in the coordinate system of the position detection system, a spatial relation between the position detection system's coordinate system and the path of movement of the motion sensor is established. Generally speaking, in embodiments in which the image sensor unit comprises a motion sensor, the capturing position at which an image is captured can solely be determined based on a known spatial relation between a coordinate in the coordinate system of the position detection system and a point on a path that is recorded by processing motion sensor signals provided by the motion sensor. In this case no position sensor is required for determining the capturing position. In particular, the required spatial relation can be achieved by moving the image sensor unit along the path from the capturing position to an end point whose position is known in the coordinate system of the position detection system or by moving the image sensor unit along the path from a starting point whose position is known in the coordinate system of the position detection system to the capturing position.

The registration method according to the invention can further comprise the step of detecting a movement of the object while capturing images and providing movement signals representing the detected movement together with a time stamp by means of a position sensor for detecting a position and orientation in the coordinate system of the position detection system that is arranged on the object. If a movement of the object during capturing images is detected an alarm signal can be triggered to signal a user that the object has moved while capturing images.

A suitable position sensor for implementing this step can be configured to provide a sensor signal representing the detected movement together with time stamp. The sensor signal can be delivered, e.g., to a position determination unit of a registration setup. The position determination unit can be configured to use the sensor signal to compensate for the detected movement of the object during image capturing by applying the detected movement as a correction value to the position of the image sensor unit that has the same time stamp as the respective sensor signal. Thereby, relating at least one point of the generated surface model to a coordinate in a coordinate system of the motion sensor and/or position sensor can be performed using a corrected capturing position.

In particular, in such embodiments in which the image sensor unit does not comprise a position sensor for detecting position and orientation in the coordinate system of the position detection unit or in embodiments in which the image sensor unit is located outside a working space of a position detection system, the path along which the image sensor unit moves is preferably solely recorded by processing motion sensor signals provided by motion sensor.

If, however, the image sensor unit further comprises an optional position sensor, the registration method can comprise the step of detecting position and orientation of the position sensor that is comprised by the image sensor unit in the coordinate system of the position detection system. From the determined position and orientation of the position sensor position and orientation of the image sensor unit in said position detection system's coordinate system can be calculated.

If the image sensor unit comprises a motion sensor and a position sensor, preferably, a starting point or an end point of a path (along which the image sensor unit is moved and that is recorded by processing motion sensor signals) is determined as a coordinate in the coordinate system of the position detection system by detecting position and orientation of the position sensor. Thereby, any point on the path and in particular the position of the sensor at which the image is captured can be spatially correlated to the position whose coordinate in the coordinate system of the position detection system is known.

If the image sensor unit also comprises a position sensor, position and orientation of the image senor unit can be tracked with the position sensor directly in the coordinate system of the position detection system. Thus, as long as the image sensor unit comprising the position sensor is moved within the working space of the position detection system, position and orientation of the image sensor unit can be directly determined within the coordinate system of the position detection system. Moreover, a starting point of a trajectory that is tracked by the motion sensor can be directly determined in the coordinate system of the position detection system by determining position and orientation of the position sensor.

The fact, that the starting point of a trajectory can be determined within the coordinate system of the position detection system can be signalled to a user, e.g., on a display or acoustically. Also the path along which the image sensor unit moves can be recorded or tracked by processing both motion sensor signals provided by motion sensor and position signals representing position values provided by the position sensor. For example, for recording the path of the image sensor it is beneficial if the motion sensor takes over from the position sensor in certain situations or supports the position sensor or can be used to correct the position values provided by the position sensor.

As long as the image sensor unit is moved within the working space of the position detection system, position and orientation of an object in relation to a position detection system can be determined based on both, motion sensor signals provided by motion sensor and position signals representing position values provided by the position sensor.

It is beneficial if both, processing motion sensor signals and position signals includes comparing both signals to improve the accuracy in recording the path along which the image sensor unit has moved.

If the image sensor unit is moved outside the working space the position sensor stops providing reliable position values. However, also when leaving a working space, the path of the image sensor unit can still be recorded in a reliable manner by processing motion sensor signals provided by motion sensor. For example, the motion sensor can take over from the position sensor the tracking of the path. Thereby, the space in which the image sensor unit can be moved in order to determine position and orientation of an object in relation to a position detection system is increased with respect to the working space of the position detection system. This allows capturing an image of an object at the most suitable position that often may lie outside of the working space of a position detection system.

The registration method according to the invention can further comprise the steps of capturing the image of the object together with a reference position sensor that is positioned relative to the object and photogrammetrically generating the surface model together with the reference position sensor from the captured image so that the position of the reference position sensor in a coordinate system of the photogrammetrically generated surface model can be determined while simultaneously providing position information in terms of coordinates of the position detection system's coordinate system. The reference position sensor can thus provide a fiducial point for the calibration. Such a reference position sensor can be used additionally to a position sensor that is attached to the object. Also the reference position sensor can serve to define a coordinate that has a known spatial relation to a point on the path. In particular, if no position sensor is attached on the object and also no position sensor is comprised in the image sensor unit, the it can be advantageous image to capture an image such that the image shows the reference position sensor together with the object so that the reference position sensor is identifiable in a coordinate system of the photogrammetrically generated surface model. The reference position sensor is then photogrammetrically generated in the coordinate system of the surface model of the object and provides a further reference position that is prior known within the coordinate system of the position detection system. Thereby, the registration accuracy can be improved.

Furthermore, if
- a reference position sensor is positioned relative to the object and
- the reference position sensors position is photogrammetrically generated in the coordinate system of the surface model the provided position information in terms of coordinates of the position detection system's coordinate system can be used to verify the determined position of the generated surface model in the position detection system's coordinate system based on processed motion sensor signals and/or position signals by calculating a deviation of said determined position based on processed motion sensor signals and/or position signals from a position of said reference position sensor in the coordinate system of the position detection system after having transformed the surface model into said position detection system's coordinate system.

Preferably, the imaging properties of the image sensor unit are known in advance.

Although it is preferred that the image sensor unit comprises a 3-D camera, in some embodiments it is beneficial if the image sensor unit comprises a monofocal image sensor. If the image sensor unit comprises a monofocal image sensor, preferably, in the registration method while moving the monofocal image sensor a plurality of images of the object are captured each at a different capturing position that lies on the trajectory. Thus, in particular if the image sensor unit comprises a monofocal image sensor it is preferred that the image sensor unit is moved while capturing a plurality of images of the surface of the object at different capturing positions. For example, the image sensor unit can continuously be guided during the registration process over the surface of the object to be detected. Here, the relative position of the image sensor unit in relation to the object (more accurately: in relation to the position detection system)—i.e. the location of the image sensor unit—and the photogrammetrically detected information (i.e., in general, optically detected image data representing a captured image) are recorded.

A continuous registration can advantageously be performed in such a way that there is no longer a need for a reference position sensor which is stationary relative to the object. Rather, the motion sensor or if present additionally a position sensor comprised by the image sensor unit would assume the function at a respective time.

Location information represented by, e.g., motion sensor signals and/or position values, and the optically detected image data are preferably fed to an iterative algorithm. This algorithm detects objects (edges, lines, circles, etc.) in the optically detected image data (e.g. in individual, images) and is also able to correlate said objects with one another over various individual images. Thus, a list of objects which were recorded by the image sensor unit comprising a monofocal image sensor from different observation directions and observation positions is produced.

Preferably, use is subsequently made of a further algorithm which is able to establish the spatial position of the objects from these data. In case of an image sensor unit comprising a monofocal image sensor, an object must have been recorded from at least two different observation directions and observation positions. Then, the object position can be established by triangulation.

If a sufficient number of objects and the positions thereof are established, it is possible to perform a conventional surface registration.

While in some situations the use of a monofocal image sensor unit is beneficial, in many other situations the registration method can be improved by using—as preferred—a 3-D camera as an image sensor unit. With a 3-D camera it is possible to three-dimensionally record the surface to be detected from the outset. The reconstruction of the surface form from two-dimensional image data, as is required in case of the image sensor unit comprising a monofocal image sensor as described before, then becomes superfluous. Known 3-D cameras record a three-dimensional surface form by virtue of the propagation times of infrared light pulses being measured. Since individual points on the surface of the object have a different distance from the infrared light source of the image sensor unit, and also from the infrared image sensor thereof, this results in pulse propagation times of different length between light source and image sensor. These pulse propagation times (or phase shifts) contain the information relating to the distance between the image sensor unit and a respective point on the surface of the object. This type of recording is also known as a TOF (time of flight) process.

The image sensor unit can also be implemented as an optical stereographic camera or as an optical multi camera to three-dimensionally record the surface of the object to be detected. An optical stereographic camera can be implemented by a camera assembly of two or more cameras that are mounted on a fixed known basis. If the image sensor unit comprises more than one entrance pupil, the entrance pupils are preferably calibrated to each other.

The photogrammetric detection of the surface is preferably performed using natural illumination, i.e. illumination present in situ.

However, in some situations it might be beneficial to project a pattern onto the surface of the object while capturing an image for producing enhanced image recordings of the surface of the object.

In such situations the registration method preferably comprises the step of projecting a pattern that is detectable by the image sensor unit onto a surface of the object while capturing the image.

For projecting a pattern onto an object the image sensor unit can be connected (preferably in a rigid manner) to a pattern projector of a registration setup. The relative position between image sensor unit and pattern projector and the imaging properties of the pattern projector are preferably known in advance. Alternatively, the pattern projector can also be connected (preferably in a rigid manner) to a motion sensor and/or a position sensor in such a way that the relative position between image sensor unit and pattern projector can be determined at all times from the motion sensor signals and/or position values provided by the motion sensor and/or position sensor of the pattern projector, respectively, and the motion sensor signals provided by the motion sensor of the image sensor unit. Then, the pattern projector can advantageously be moved independently of the image sensor unit such that the image sensor unit is able in each case to record particularly meaningful individual images with a well evaluable pattern distortion.

The pattern projector can be used to project an artificial structure (a pattern, for example a strip pattern), the dimensions of which are known, onto the target surface in the capturing region of the image sensor unit. The pattern projected onto the surface can be optically detected by the image sensor unit such that individual images emerge, which show the pattern projected onto the surface with the distortions thereof caused by the form of the surface. The three-dimensional surface can be established in each individual image on the basis of the distortions of the pattern. It can be, that an overall surface can be determined by combining the three-dimensional partial surfaces of the individual images using the over-lapping regions. This overall surface can then be used with the conventional surface registration.

The pattern projector can be configured to project the pattern using infrared light or ultraviolet light. In this case, the image sensor unit is preferably equipped with an infra-red-sensitive or ultra-violet-sensitive image sensor. This embodiment variant is advantageous in that the projected pattern is invisible to a surgeon and therefore not able to interfere.

In place of, or in addition to, the pattern projector, provision can also be made for a self-adhesive pattern film. This film is fastened in the target region. As a result of the known patterns on the film, the form of the film, and hence also the surface structure, can be detected.

The registration method can also comprise the step of arranging a plurality of infrared markers on the surface of the object.

The infrared markers can be detected by an image sensor unit that is equipped with an infrared-sensitive image sensor. By localizing the infrared markers arranged on the surface of the object the surface topography can be photogrammetrically generated on the basis of the infrared markers from a captured image. This allows detecting the surface and photogrammetrically generating a surface model of the object even if visible light is insufficient to detect the surface.

The registration method can further comprise the step of assigning a time stamp to each captured image. For example, the image sensor unit can be configured to transmit captured images to a position determination unit of a registration setup together with a time stamp.

The registration method can further comprise the step of delivering position values together with a time stamp. This step can be implemented with a position detection system that is configured to deliver position values to a position determination unit of a registration setup together with a time stamp. It is also possible that a position determination unit of a registration setup is configured to request position values from the position detection system and/or motion sensor signals from the motion sensor and to attach a time stamp to a respective one of the position values and/or motion sensor signals.

The motion sensor can be configured to deliver the motion sensor signals to a tracking unit of a registration setup together with a time stamp. If, for example, a position sensor is arranged on the object and configured to detect whether an object moves while capturing an image, preferably, position values provided by the positon sensor as well as images captured with the image sensor unit are delivered to a position determination unit together with a time stamp. The position determination unit can be configured to assign a position value to an image that carries the same time stamp. The capturing position at which the image as been captured can then be corrected by the detected movement represented by the position value as a correction value to the capturing position, i.e. the position of the entrance pupil relative to the object.

Additionally or alternatively the registration method can further comprise the step of streaming image data that represent captured images. This step can be implemented with the image sensor unit being configured to stream image data that represent captured images to a position determination unit of a registration setup. The image stream can be visualized on a monitor of the registration setup.

In the registration method according to the invention images can also be captured on an automized trigger. An automized trigger can be based on the analysis of streaming image data from the image sensor unit. For example, the image sensor unit can analyse streaming image data and if the object is recognized in a certain position with respect to the image sensor unit the automized trigger is given. For example, the image sensor unit can capture an image on an automized trigger that is based on the analysis of the determined position of the image sensor unit in relation to a reference position sensor that is attached to the object. For example, if the image sensor unit is at a certain position in relation to the reference position sensor the automized trigger can be given and an image is captured.

The registration method can further comprise determining a distortion of an alternating electromagnetic field by photogrammetrically detecting a plurality of position sensors located at different places or a movable position sensor which is moved while capturing an image with said image sensor unit wherein position and orientation of the position sensors or the position sensor in the coordinate system of the position detection system are directly determinable via the position detection system.

In order to be able to determine possible distortions of an alternating electromagnetic field of the position detection system in all previously described embodiments of the registration method, use is made of a plurality of position sensors at different places or of a movable position sensor which is moved during the photogrammetric detection of a surface of the object or body part and the position of which sensor or sensors is likewise detected photogrammetrically. The distortions of the alternating electromagnetic field can then be established from the respective photogrammetrically detected place of the movable position sensor or of the position sensors and from the place determined by the respective position sensor itself by means of the position detection system. Then, it is possible—so to speak—to photogrammetrically measure the alternating electromagnetic field itself.

With respect to the registration setup the object of the invention is achieved by a registration setup for determining position and orientation of an object in relation to a position detection system. The setup comprises a position detection system, at least one image sensor unit, a tracking unit, a position determination unit and a coordinate transformation unit.

The position detection system is configured for determining position and orientation of a position sensor and the at least one image sensor unit comprises at least one motion sensor. The image sensor unit is configured for capturing an image of the object and for photogrammetrically generating a surface model of the object from at least one captured image. The motion sensor is configured for providing motion sensor signals representing a sequence of positions of the moving image sensor unit relative to the position detection system over time.

The tracking unit is configured for recording said path of the image sensor unit by processing motion sensor signal provided by motion sensor.

The position determination unit is configured for relating at least one point of said determined path to a coordinate in the coordinate system of the position detection system, determining a capturing position of the image sensor unit based on the determined path and the known spatial relation of the at least one point on the determined path and said coordinate and relating at least one point of the generated surface model to a coordinate in a coordinate system of the motion sensor and/or position sensor by means of calibration.

The coordinate transformation unit is configured for transforming the generated surface model into the coordinate system of the position detection system.

The setup can further comprise a pattern projector that is connected to the at least one image sensor unit or that comprises the at least one image sensor unit and wherein the pattern projector is configured for projecting a pattern onto the body.

Preferably the image sensor unit comprises a stereo camera or a multiple camera arrangement or a time-of-flight camera. In certain embodiments, however, the image sensor unit can also comprise a single camera.

Preferably the image sensor unit is connected to the position determination unit. Preferably the motion sensor is connected to the tracking unit. The position determination unit is also connected to the position detection system. The position determination unit is connected to the coordinate transformation unit. At least some of the connections between the components can be implemented as a universal serial bus (USB)-connection. However, at least some of the connections between the components can also be implemented as wireless, e.g., Bluetooth, connection.

The motion sensor can be a sensor device or an array of gyroscopes and accelerometers which deliver motion sensor signals representing motion parameters in six degrees of freedom, e.g., three linear accelerations and three angular velocities.

The components of the registration setup are preferably elements of a computer or other data processing system.

Optionally, the setup can further comprise an image sensor unit holder comprising a form-fit adapter that is configured for reproducibly accepting the image sensor unit in a predefined and fixed position. Position and orientation of the image sensor unit holder in relation to the position detection system is preferably known a priori or determinable by means of the position detection system.

For example, a position sensor that can be attached to the image sensor unit holder such that position and orientation of this position detector can be detected by the position detection system. From the detected position and orientation of the position sensor position and orientation of the image sensor unit holder can be calculated. If the image sensor unit is held by the holder, position and orientation of the image sensor unit, too, can be calculated in relation to the position detection system. Advantageously, the image sensor unit holder that is equipped with a position sensor can be positioned freely within the working space of a position detection system and used for providing a known position in the coordinate system of the position detection system from or to which the image sensor unit can be moved along a path that can be recorded by processing, e.g., motion sensor signals. Thereby, the capturing position at which an image is captured can be determined and used for determining position and orientation of an object in relation to a position detection system.

If the image sensor unit holder does not comprise a position sensor, position and orientation of the image sensor unit holder in relation to the position detection system is preferably known a priori by fixing the image sensor unit holder relative to the position detection system. The image sensor unit holder is then fixed at constant relative distance and orientation to the position detection system or even directly to the position detection system. It can then be sufficient to calibrate the image sensor unit holder once to the position detection system such that position and orientation of the image sensor unit holder relative to the position detection system is known.

According to a further aspect that can be realised independently of other aspects described herein and thus constitutes an invention on its own, the object of the invention is achieved by an alternative registration method for determining position and orientation of an object in relation to an electromagnetic position detection system. The method according to this aspect comprises the steps of
    providing an image sensor unit that is rigidly fixed to a field generator of an electro-magnetic position detection system,
    determining a transformation function for transformations between a surface model's coordinate system and a coordinate system of the electromagnetic position detection system by means of calibration,
    capturing an image of a surface of an object with said image sensor unit,
    photogrammetrically generating a surface model of the object from the captured image,
    transforming the photogrammetrically generated surface model into the coordinate system of a position detection system.

This alternative registration method does not require that the coordinate of the capturing position in the position detection system's coordinate system is determined using one or more motion sensors and/or position sensors. Because the image sensor unit is combined with the field generator in a fixed setup, it is only required to calibrate the image sensor unit to the field generator in order to determine position and orientation of an object in relation to position detection system and thus the transformation function required to transform the coordinates of the image sensor unit's coordinate system to coordinates of the position detection system's coordinate system. However, optionally, the image sensor unit can comprise a motion sensor and/or a position sensor. Preferably, the image sensor unit comprises an optical stereographic camera or an optical multi camera or a time-of-flight camera.

The alternative registration method according to this further aspect can comprise the step of projecting a pattern that is detectable by the image sensor unit onto a surface of the object while capturing the image.

The alternative registration method according to this further aspect can also comprise assigning a time stamp to each captured image.

Alternatively or additionally, the alternative registration method according to this further aspect can comprise streaming image data that represent captured images from the image sensor unit to a tracking unit.

Optionally the alternative registration method according to this further aspect can comprise the steps of
    capturing the image of the object together with a reference position sensor for detecting a position and orientation in the coordinate system of the position detection system that is arranged on the object that is positioned relative to the object, and
    photogrammetrically generating the surface model together with the reference position sensor from the captured image so that a position of the reference position sensor in a coordinate system of the photogrammetrically generated surface model is determined while simultaneously providing position information in terms of coordinates of the position detection system's coordinate system.

With respect to the registration setup the object of the invention is also solved by an alternative registration setup for determining position and orientation of an object in relation to a position detection system that can be realised independently of other aspects described before and thus constitutes an invention on its own, comprising an electromagnetic position detection system comprising a field generator for generating an alternating electromagnetic field, an image sensor unit that is rigidly fixed to the field generator, wherein the image sensor unit is configured for capturing an image of the object and for photogrammetrically generating a surface model of the object from at least one captured image, and a calibration unit that is configured for determining a transformation function for transformations between a surface model's coordinate system and a coordinate system of the electromagnetic position detection system by means of calibration, and a coordinate transformation unit that is configured for employing transformation functions for transforming coordinates representing the surface model in the surface model's coordinate system into the coordinate system of the position detection system.

Typically, the position detection system's coordinate system is spanned by or associated with a field generator or light source of a respective position detection system.

This alternative registration setup can also comprise a pattern projector that is connected to the image sensor unit or that comprises the image sensor unit and wherein the pattern projector is configured for projecting a pattern onto the body. The image sensor unit of this alternative registration setup can comprise a motion sensor and/or a position sensor.

BRIEF DESCRIPTION OF THE DRAWINGS

In the following, preferred embodiments of the invention will be described with reference to the figures. In the figures.

DETAILED DESCRIPTION

Figure 1:
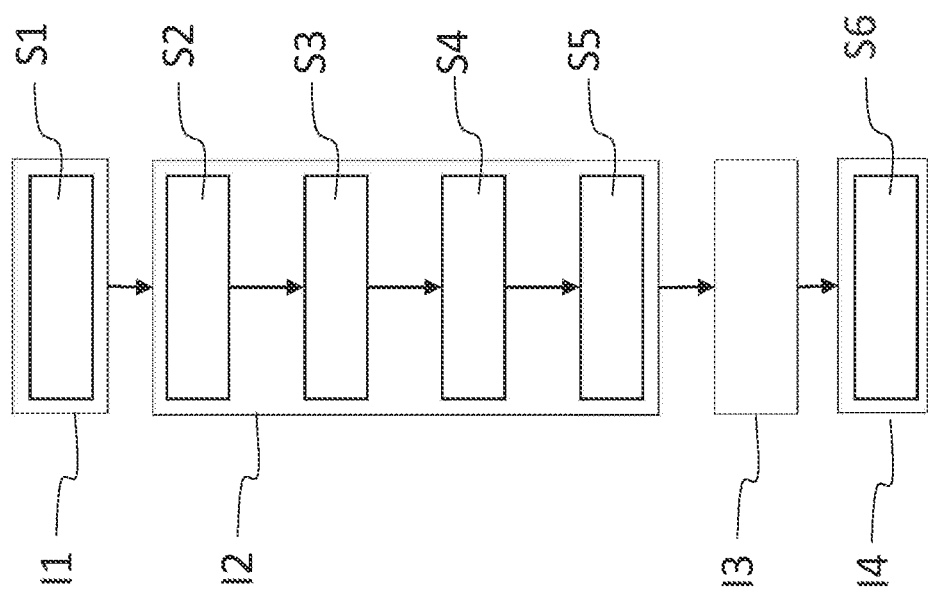
FIG. 1: shows a flow diagram representing a registration method for determining position and orientation of an object in relation to a position detection system.

In FIG. 1 a flow diagram representing a registration method according to the concept of the invention is shown.

The registration method comprises the steps

I1: capturing an image of a surface of an object with an image sensor unit comprising at least one motion sensor and/or at least one position sensor, I2: determining a capturing position of the image sensor by processing motion sensor signals provided by said motion sensor and/or position signals provided by said position sensor, I3: photogrammetrically generating a surface model of the object from the captured image, and I4: transforming the photogrammetrically generated surface model into the coordinate system of a position detection system.

Steps I1, I2 and I3 can be conducted in different orders. For example, in some variants the capturing position can be determined before capturing the image or the surface model can be photogrammetrically generated before determining the capturing position. However, the surface model has to be photogrammetrically generated before transforming the surface model into the coordinate system of a position detection system.

Preferably the image sensor unit comprises a time-of-flight camera, an optical stereographic camera or an optical multi camera to three-dimensionally record the surface of the object of which position and orientation in relation to a position detection system shall be determined.

In a preferred embodiment the step I1 of capturing an image of a surface of an object with an image sensor unit comprises the sub-step of providing at least one image sensor unit comprising at least one motion sensor for detecting a linear acceleration and/or rotational rate over time independent of the position detection system (S1).

The motion sensor can be an inertial sensor comprising accelerometers or a gyroscopes or a magnetometer. Also several of these sensors can be comprised in the image sensor unit to form a motion sensor arrangement. While moving the image sensor unit each motion sensor provides motion sensor signals representing the detected linear acceleration or rotational rate over time.

Additionally or alternatively to the motion sensor the image sensor unit can comprise a position sensor for determining position and orientation of the image sensor unit in relation to a position detection system.

The step I2 of determining a capturing position of the image sensor unit can comprise sub-steps. In one preferred embodiment, determining a capturing position of the image sensor unit can be achieved by S2: moving the image sensor unit along a spatial path relative to the position detection system, S3: recording said path of the image sensor unit by processing motion sensor signals provided by motion sensor, S4: relating at least one point of said determined path to a coordinate in the coordinate system of the position detection system, and S5: determining a capturing position of the image sensor unit based on the determined path and the known spatial relation of the at least one point on the determined path and said coordinate.

Sub-steps S2, S3, S4 and S5 serve to determine the position of the image sensor unit in terms of coordinates of the position detection system coordinate system.

For example, the known spatial relation between a point on said path and a coordinate in the coordinate system of the position detection system can be established by moving the image sensor unit from or to a position whose coordinate is known in the position detection system's coordinate system.

In some variants of step I2 additionally or alternatively to using a motion sensor for determining position and orientation of the image sensor unit relative to the position detection system a position sensor can be used. In such embodiments the capturing position can be determined by detecting position and orientation of the position sensor. The position sensor is comprised by the image sensor unit.

In another alternative of step I2, the capturing position can also be determined by capturing an image of an object together with a reference position sensor that is attached to or placed relative to the object.

Yet, in another alternative for determining the capturing position (step I2) the image sensor unit can be fixed to a predefined position that is known in the coordinate system of the position detection system. Such a predefined position can be the position of an image sensor unit holder that is calibrated to the position detection system or that comprises a position sensor for detecting position and orientation relative to the position detection system. If a position sensor, e.g., a position sensor arranged on the object, has been recorded together with the object, the position sensor is photogrammetrically generated in the coordinate system of the surface model of the object. Thereby, a coordinate in the position detection system associated with the position of the position sensor can be directly spatially correlated to a coordinate in the coordinate system of the generated surface model.

The step I4 of transforming the photogrammetrically generated surface model into the coordinate system of a position detection system can comprise the sub-step of relating at least one point of the generated surface model to a coordinate in a coordinate system of the motion sensor and/or position sensor by means of calibration (S6).

For example, transformation functions can be determined for transformations of coordinates between the motion sensor's and/or position sensor's coordinate system and the coordinate system of the image sensor unit by means of calibration. This can include that the coordinate of the capturing position of the image sensor unit is determined in the coordinate system of the motion and/or the position sensor, respectively. The thus determined transformation functions can be used for transforming the photogrammetrically generated surface model into the coordinate system of the position detection system.

Sub-step S6 serves for assigning points of the surface model to coordinates in the sensor's coordinate system.

The step of transforming the generated surface model into the coordinate system of the position detection system can be conducted considerably later, e.g., on another day than at least some of the previous sub-steps.

In different embodiments of the registration method only some of the steps of capturing an image of a surface of an object with an image sensor unit I1, determining a capturing position of the image sensor unit I2, and transforming the photogrammetrically generated surface model into the coordinate system of a position detection system I4 comprise the sub-steps as elaborated above. For example, in one embodiment only the step of determining a capturing position of the image sensor unit I2 comprises the sub-steps as described above. In other embodiments the coordinates of the capturing position in the coordinate system of the position detection system is be determined without making use of a motion sensor, e.g., using a position sensor. In these embodiments the step of transforming the photogrammetrically generated surface model into the coordinate system of a position detection system I4 can still comprise the sub-step S6 as specified before.

Figure 2:
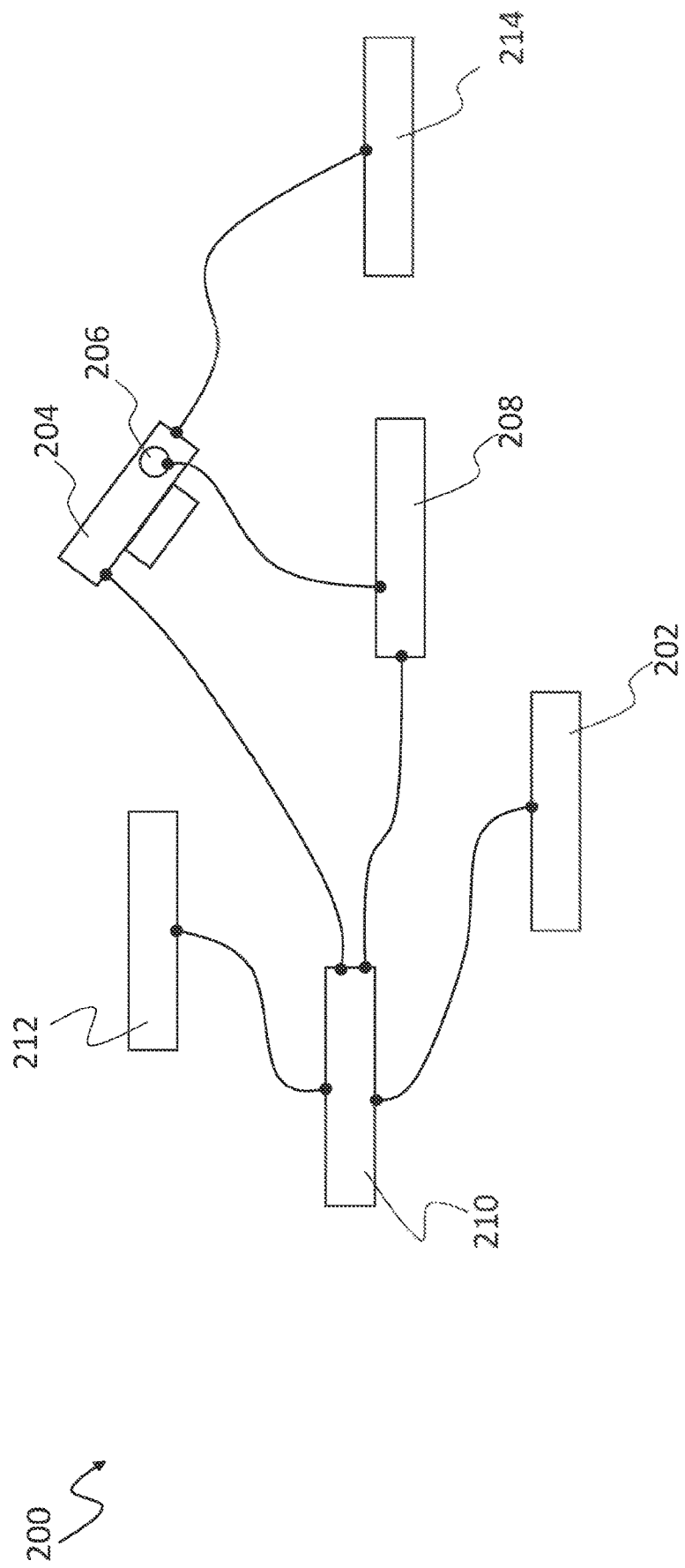
FIG. 2: shows a schematic block diagram of a registration setup.

In FIG. 2 a schematic block diagram of a preferred embodiment of registration setup 200 is shown.

The registration setup comprises a position detection system 202, an image sensor unit 204 comprising at least one motion sensor 206, a tracking unit 208, a position determination unit 210 and a coordinate transformation unit 212.

The position detection system 202 that is configured for determining position and orientation of a position sensor (not shown). The position detection system 202 can be an optical, electromagnetic or ultrasound-based position detection systems. Preferably, the position detection system 202 is an electromagnetic position detection system comprising a field generator for generating an alternating electromagnetic field. If the position detection system 202 is an electromagnetic position detection system a position sensor for detecting a position and orientation in the coordinate system of the position detection system comprise at least one coil. The position detection system 202 is connected to the position determination unit 210 for transmitting position signals representing position values provided by a position sensor to the position determination unit for further processing.

The image sensor unit 204 is configured for capturing an image of an object (not shown) and for photogrammetrically generating a surface model of the object from at least one captured image. The image sensor unit 204 can comprise a monofocal image sensor. For determining position and orientation of an object in relation to a position detection system the image sensor unit comprising a monofocal image sensor preferably is continuously guided during the registration process over the surface of the object to be detected. While moving image sensor unit comprising a monofocal image sensor at least two images are captured from different observation directions and observation positions. Then, the object position can be established by means of triangulation. However, preferably, the image sensor unit comprises a stereo camera or a multiple camera arrangement or a time-of-flight camera to three-dimensionally record the surface of an object to be detected. An optical stereographic camera can for example be implemented by a camera assembly of two or more cameras that are mounted on a fixed known basis. The image sensor unit 204 is connected to an optional pattern projector 214. The image sensor unit 204 is also connected to the position determination unit 210 for providing the photogrammetrically generated surface model for further processing.

The motion sensor 206 is configured for providing motion sensor signals representing a sequence of positions of the moving image sensor unit 204 relative to the position detection system 202 over time. By processing such motion sensor signals provided by motion sensor 206 a path can be recorded along which the image sensor unit 204 moves during registration. The image senor unit 204 can comprise only one motion sensor 206 or an arrangement of several motion sensors that are configured to detect a linear acceleration and rotational rate while the image senor unit 202 moves relative to the position detection system 202. The motion sensor 206 is connected to the tracking unit 208 for transmitting motion sensor signals to the tracking unit 208 for recording a path along which the image sensor unit 204 has been moved.

The tracking unit 208 is connected to the image sensor unit 202 and to the position determination unit 210 and configured for recording a path along which the image sensor unit 204 moves relative to the position detection system 202 by processing motion sensor signal provided by motion sensor. The tracking unit 208 is connected to the motion sensor 206 comprised by the image sensor unit 204.

The position determination unit 210 is configured for relating at least one point of a determined path to a coordinate in the coordinate system of the position detection system 202. Furthermore, the position determination unit 210 is configured for determining a capturing position of the image sensor unit 204 at which an image of the object is captured based on the determined path and the known spatial relation of the at least one point on the determined path and said coordinate in the coordinate system of the position detection system 202. The position determination unit 210 is also configured for relating at least one point of the generated surface model to a coordinate in a coordinate system of the motion sensor by means of calibration. The position determination unit 210 is connected to the position detection system 202 for receiving position signals, and has access to the tracking unit 208 for further processing the path along which the image sensor unit 204 has been moved as recorded by the tracking unit 208. The position determination unit 210 is also connected to the coordinate transformation unit 212 for providing information on the spatial relation between a position of the generated surface model and the position of the image sensor unit 204 relative to the position detection system that corresponds to the determined relative position of the motion sensor 206. Further, the position determination unit 210 is connected to the image sensor unit 204 for accessing the surface model that is photogrammetrically generated by the image sensor unit 204.

The coordinate transformation unit 212 is connected to the position determination unit 210 and configured for transforming the generated surface model into the coordinate system of the position detection system 202.

The setup 200 further comprise an optional pattern projector 214 that is connected to the image sensor unit 202. The pattern projector 214 is configured for projecting a pattern onto a body.

At least some of the connections between the components of the registration setup 200 can be implemented as universal serial bus (USB)-connections. At least some of the connections between the components of the registration setup 200 can also be implemented as wireless, e.g., Bluetooth, connections.

Figure 3:
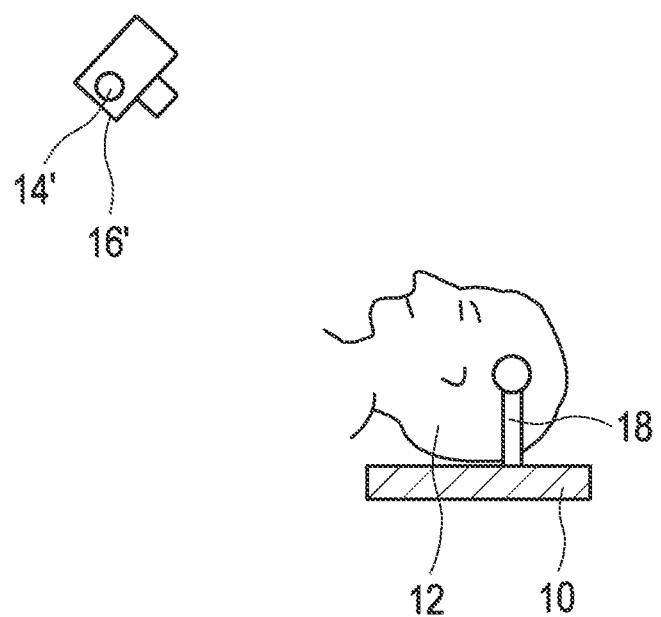
FIG. 3: shows an image sensor unit for capturing an image of a patient's head, wherein the image sensor unit comprises a motion sensor.

In FIG. 3 an image sensor unit 16' is shown that comprises a motion sensor 16'. The image sensor unit is configured for capturing an image if a patient's head 12. The head 12 and the image sensor unit 16' are positioned relative to a position detection system 10 that is configured to determine position and orientation of a reference position sensor 18 that is rigidly fixed to the position detection system 10. The reference position sensor 18 is positioned relative to the head 12 such that if an image of the head is captured via the image sensor unit 16' the position sensor 18, too, will be visible in that image. If a surface model of the object is photogrammetrically generated, e.g., by the image sensor unit 16', the reference position sensor, too, will be photogrammetrically generated together with the surface model. The reference position sensor 18 is identifiable in a coordinate system of the photogrammetrically generated surface model and, thus, provides reference to a coordinate in the coordinate system of the position detection system. Thereby, points of the point cloud of the surface model can be directly linked to a coordinate in the coordinate system of the position detection system and assigned to corresponding coordinates in the coordinate system of the position detection system.

However, providing this reference sensor 18 is not necessary but optional. In fact, determining position and orientation of the head in relation to a position detection system 10 can be achieved also without providing the reference position sensor 18. This is achieved by recording the path along which the image sensor unit 16' is moved by processing motion sensor signals provided by the motion sensor 14'. The recorded path is comprised of a sequence of locations of the moving image sensor unit 16' that were detected by the motion sensor 14' over time. Because at least one point on the recorded path has a known spatial relation to a coordinate in the coordinate system of the position detection system the recorded path can be determined in that coordinate system. Thereby the capturing position at which an image has been captured by the image sensor unit 16' can be determined in the coordinate system of the position detection system 10. After calibrating the position of the entrance pupil of the image sensor unit to the position of the motion sensor 206, coordinates of the surface model photogrammetrically generated by the image sensor unit 16' in the surface model's coordinate system can be transformed into the coordinate system of the position detection system 10.

Figure 4:
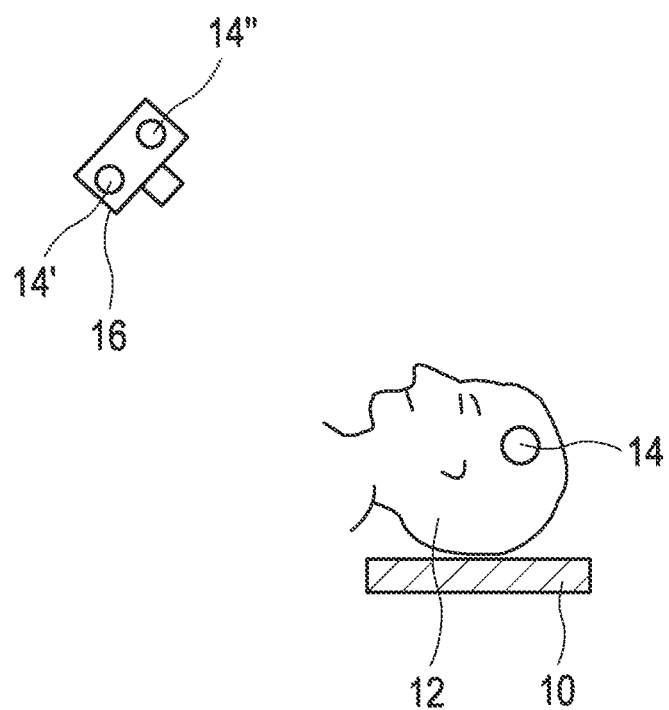
FIG. 4: shows an image sensor unit for capturing an image of a patient's head, wherein the image sensor unit comprises a motion sensor and a position sensor for detecting a position and orientation in a coordinate system of a position detection system.

In FIG. 4 an image sensor unit 16 is shown that comprises a motion sensor 14' and an additional position sensor 14" for detecting position and orientation in a coordinate system of position detection system 10. A further optional position sensor 14 is attached to a head 12 whose position and orientation in relation to the position detection system 10 shall be determined. If an image is captured of the head 12, the image will show the further position sensor 14 together with the head. When photogrammetrically generated a surface model of the head 12 the position sensor 14, can be identified in the coordinate system of the surface model and can serve to link a point of the surface model to the coordinate system of the position detection system 10.

As long as the image sensor unit 16 is moved within the working space of the position detection system 10, position and orientation within the coordinate system of the position detection system 10 can directly be determined by means of detecting position and orientation of position sensor 14" attached to the image sensor unit 16. However, if the image sensor unit 16 is moved outside the working space of the position detection system 10 position and orientation of the image sensor 10 with respect to the position detection system 10 cannot be determined anymore by detecting the position sensor 14".

However, also when leaving the working space of the position detection system 10 a capturing position at which an image of the head 12 is captured can still be determined by processing motion sensor signals provided by the motion sensor 14'. Thereby, a path along which the image sensor unit 16 moves can be recorded. At least one point has to be related to a coordinate in the coordinate system of the position detection system 10 in order to be able to determine the coordinate of the capturing position in the coordinate system of the position detection system 10. Then the capturing position, i.e. the position of the entrance pupil at the time of capturing the image relative to the object, can be determined in the coordinate system of the position detection system 10. By means of calibration, a point on a surface model as photogrammetrically generated from an image of the head 12 can be related to a coordinate in a coordinate system of the motion sensor and/or position sensor. After determining position and orientation of, e.g., the position sensor's coordinate system in relation to the position detection system's 10 coordinate system, the coordinate system of the surface model can be aligned to the coordinate system of the position detection system 10. This works independently of whether or not the image sensor unit is moved inside the working space of the position detection system 10.

Figure 5:
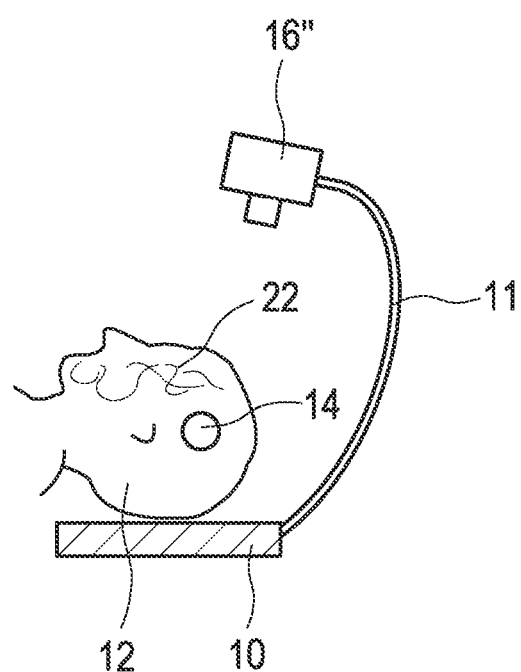
FIG. 5: shows an image sensor unit that is mounted to an image sensor unit holder which is rigidly or movably fixed to a position detection system.

In FIG. 5 an image sensor unit 16" that is mounted to an image sensor unit holder 11 which is fixed to a position detection system 10 is shown. In contrast to the embodiments described with respect to FIGS. 1 to 4 the image sensor unit 16" is not equipped with a motion sensor or a position sensor. However, at least one of a motion sensor or a position sensor can optionally be comprised by the image sensor unit 16". This could be of advantage if the image sensor unit holder 11 can be moved relative to the position detection system, e.g., like a pivot arm such that the capturing position is not fixed relative to the position detection system.

In case the image sensor unit holder 11 is rigidly fixed to the position detection system 10, e.g., the field generator of an electromagnetic position detection system, it can be sufficient to calibrate the capturing position of the image sensor unit 10 once to the position detection system 10 such that the capturing position 10 is known in the coordinate system of the position detection system 10.

The image sensor unit 16" can be a single camera, a time-of-flight sensor (TOF sensor) or a camera assembly of 2 or more cameras on a fixed known basis, i.e. a stereoscopic camera.

The image sensor unit 16" comprises a pattern projector (not shown) for projecting a pattern 22 on a patient's head. Projecting a pattern 22 onto the surface of the head 12 can lead to enhanced image recordings of the surface.

Further a position sensor 14 is attached to the patient's head 12. When capturing an image of the head this position sensor will be visible, too, in that image. The position sensor 14 will be been photogrammetrically generated from the image together with the head 12 and thus can serve too link a point on the surface model to the coordinate system of the position detection system 10.

Figure 6:
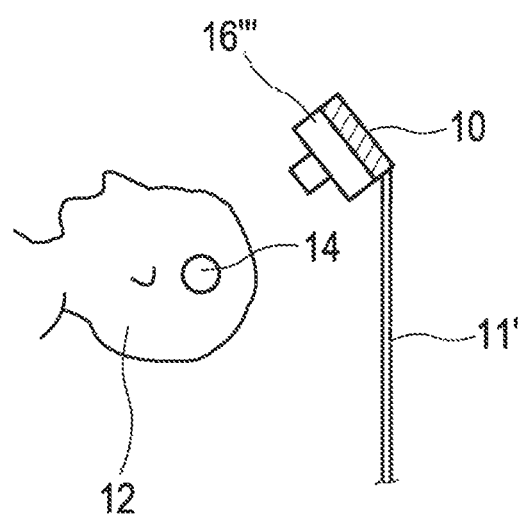
FIG. 6: shows an image sensor unit that is rigidly mounted to a position detection system, wherein the arrangement of image sensor unit and position detection system is mounted to an image sensor unit holder.

In FIG. 6 an image sensor unit 16''' that is rigidly fixed to a field generator 10 of an electromagnetic position detection system is shown. The fixed setup of image sensor unit 16''' and field generator 10 is mounted to an image sensor unit holder 11'. In a different embodiment (not shown), the fixed setup of image sensor unit and field generator is not mounted to an image sensor unit holder but can be moved freely, e.g., by hand by a user.

In the embodiment shown, the image sensor unit holder 11' is positioned relative to a head 12 whose position and orientation in relation to the position detection system 10 shall be determined. The image sensor unit holder 11' can be mounted at a fixed position or can be movable relative to the head 12. For example, the image sensor unit holder 11' can be implemented as a pivot arm.

Advantageously, if field generator 10 and image sensor unit 16''' are combined in a fixed setup, position and orientation of the image sensor unit 16''' in the coordinate system of the position detection system as spanned by the field generator 10 can be determined without using motion sensors and/or position sensors. When an image sensor unit is rigidly fixed to a field generator using motion sensors and/or position sensors is not required for determining position and orientation of an object in relation to a position detection system.

In particular, it is also not required to arrange a position sensor relative to the object that is visible in a captured image in order to enable transforming a photogrammetrically generated surface model into the coordinate system of a position detection system.

In fact, in a fixed setup the field generator 10 itself can be considered as a kind of position sensor to which the image sensor unit 16''' can be calibrated. After calibration to the field generator 10, position and orientation of the image sensor unit (e.g., the position of an entrance pupil) in relation to the position detection system are known. Based on the known spatial relation between image sensor unit and field generator a photogrammetrically generated surface model can be directly transformed into the coordinate system of a position detection system.

For example, transformation functions for transformations between the image sensor unit 16''' (more precise, between an entrance pupil of a camera of the image sensor unit 16''') and the field generator can be determined by means of calibration. Using these transformation functions, coordinates of a photogrammetrically generated surface model defined in the coordinate system of a camera of the image sensor unit 16''' can be transformed into coordinates representing the surface model in the position detection system's coordinate system.

The image sensor unit 16''' comprises preferably a 3-D camera and can optionally be equipped with a motion sensor and/or a position sensor.

Attached to the head 12 there is an optional position sensor 14 that preferably is visible in an image of the head 12 that has been captured by the image sensor unit 16'''. By determining position and orientation of this position sensor in the coordinate system of the position detection system as spanned by the field generator 10, a point in the coordinate system of a surface model of the head 12 that is photogrammetrically generated from the captured image that also shows the position sensor 14 can be assigned to a coordinate in the position detection system's coordinate system.

Figure 7:
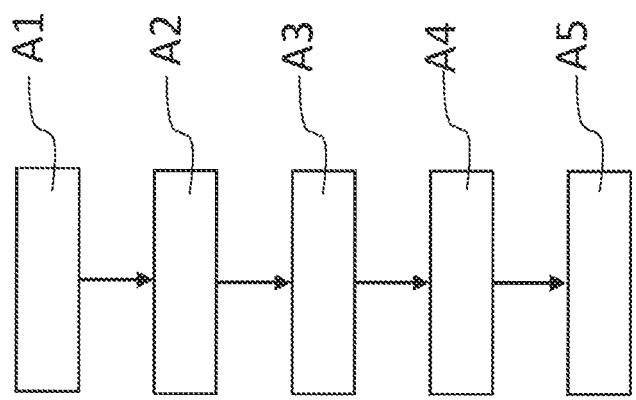
FIG. 7: shows a flow diagram representing a registration method according to an alternative embodiment.

In FIG. 7 a flow diagram representing a registration method according to an alternative embodiment is shown.

The alternative registration method for determining position and orientation of an object in relation to an electromagnetic position detection system, wherein the method comprises the steps of A1: providing an image sensor unit that is rigidly fixed to a field generator of an electromagnetic position detection system, A2: determining a transformation function for transformations between a surface model's coordinate system and a coordinate system of the electromagnetic position detection system by means of calibration, A3: photogrammetrically generating a surface model of the object from the captured image, A4: capturing an image of a surface of an object with said image sensor unit, A5: transforming the photogrammetrically generated surface model into the coordinate system of a position detection system.

Figure 8:
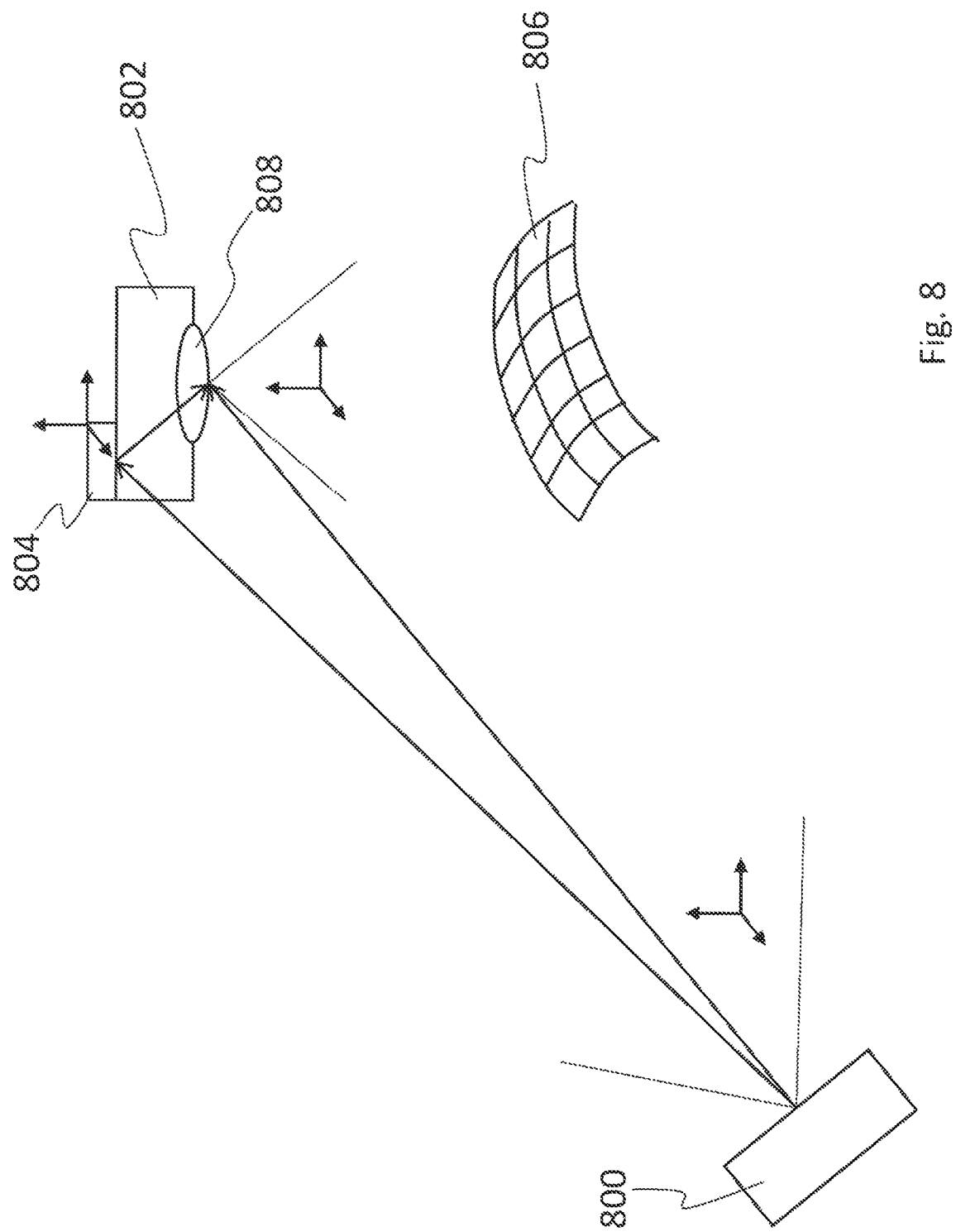
FIG. 8: schematically visualizes how position and orientation of an object can be determined in relation to a position detection system if the image sensor unit comprises a position sensor.

FIG. 8 schematically visualizes how position and orientation of an object can be determined in relation to a position detection system 800 if the image sensor unit 802 comprises a position sensor 804.

At a capturing position (that is the position of the entrance pupil when the image is captured) an image of the object is captured and from the captured image a surface model 806 of the object is photogrammetrically generated.

Position and orientation of the position sensor 804 are known in the coordinate system of the position detection system 800.

However, the coordinate system of the position sensor 804 and the coordinate system of the image sensor unit 802 have an offset. The coordinate system of the image sensor unit 802, preferably, is defined such that the origin of the coordinate system is at the position of the entrance pupil 808 of the image sensor unit 802. The offset can be determined by means of calibration. This can comprise that transformation functions are determined for transformations between the coordinate systems of the position sensor 804 and the image sensor unit 802. Taking into account the offset, a coordinate in the coordinate system of the image sensor unit 802 can be transformed into the coordinate system of the position detection system 800 such that position and orientation of the object 806 can be determined in relation to the position detection system 800.

Figure 9:
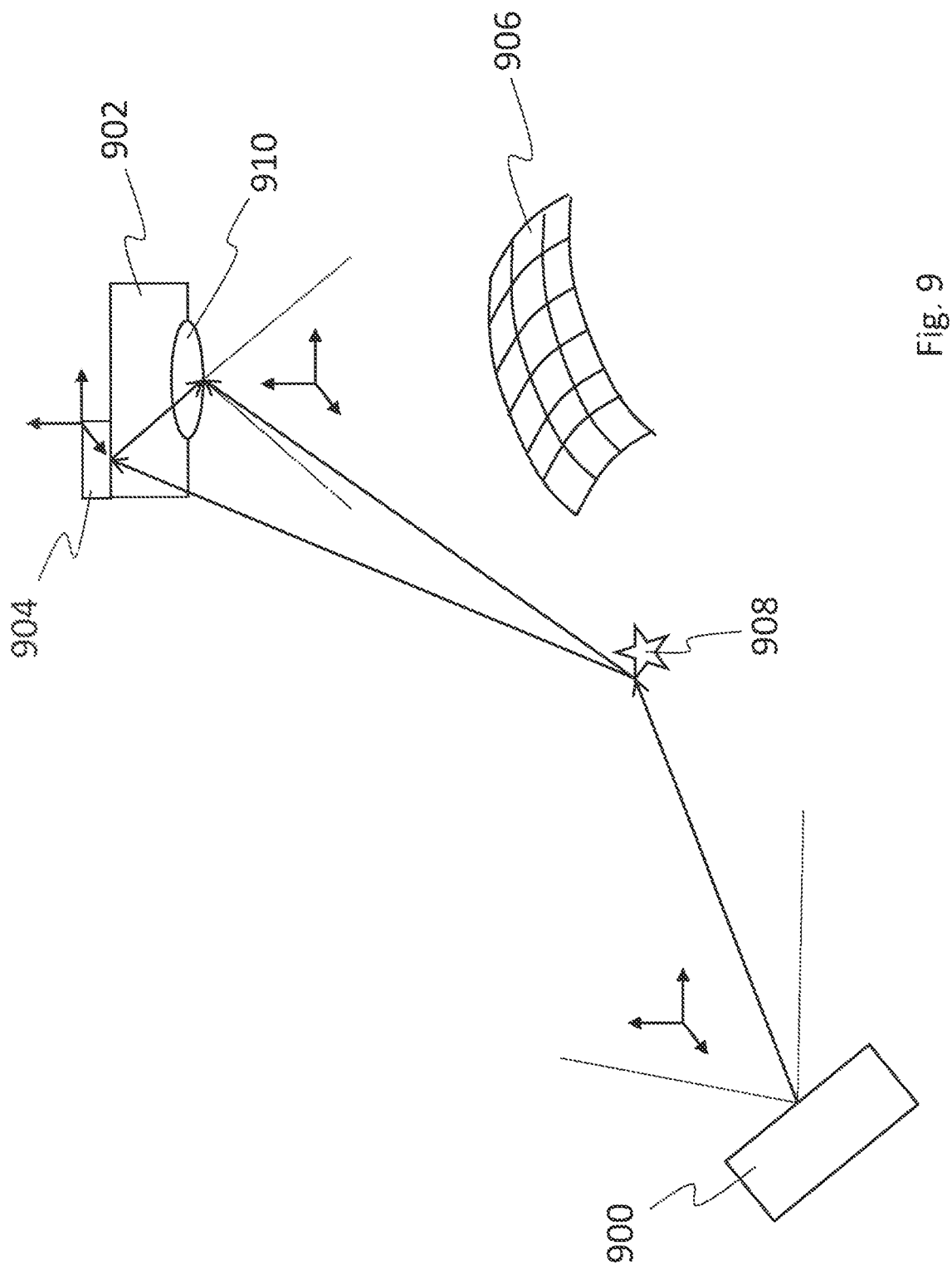
FIG. 9: schematically visualizes how position and orientation of an object can be determined in relation to a position detection system if the image sensor unit solely comprises a motion sensor.

FIG. 9 schematically visualizes how position and orientation of an object can be determined in relation to a position detection system 900 if the image sensor unit 902 solely comprises a motion sensor 904 and no position sensor.

Position and orientation of the motion sensor 904 cannot be determined by the position detection system 900. However, the motion sensor 904 can provide motion sensor signals that can be processed for recording a path along which the image sensor unit 902 has been moved from or to a capturing position. To determine position and orientation of the path (and thus the capturing position at which an image of an object 906 has been captured) in the coordinate system of the position detection system, a known spatial relation between at least one point on the path and a position 908 whose coordinate is known in the coordinate system of the position detection system 900 needs to be established.

This can be done by moving the image sensor unit 902 from the capturing position to this known position 908 or vice versa such that the known position 908 is either the starting or the end point of the path. The starting or end point of the path thus has a known coordinate in the coordinate system of the position detection system. Consequently, the coordinates of this path that are initially defined in the coordinate system of the motion sensor can be transformed into coordinates of the position detection system 900 by using that the coordinate of the starting or end point of the path is known in both, the coordinate system of the motion sensor and in the position detection system's coordinate system. Thus coordinates of the capturing position in the coordinate system of the image sensor unit 902 can be transformed into coordinates in the position detection system's coordinate system.

The coordinate system of the motion sensor 904 has an offset to the coordinate system of the image sensor unit 902 whose origin preferably is at the position of the entrance pupil 910 of the image sensor unit 902. In order to determine the coordinates of the origin of the image sensor unit's coordinate system in the coordinate system of the position detection system 900 this offset has to be determined, e.g., by means of calibration. By means of calibration transformation functions can be determined for transforming a coordinate in the coordinate system of the image sensor unit 902 in the coordinate system of the motion sensor 904. If this transformation functions are determined, a coordinate in the coordinate system of the image sensor unit 902 can be transformed into the coordinate system of the position detection system 900 taking into account the thus determined transformation functions.

The invention claimed is:

1. A method for non-tactile registration of an object with a position detection system, the method comprising:
   generating a surface model of the object based on one or more images captured with an image sensor unit positioned at a capturing position, wherein the image sensor unit comprises a motion sensor;
   determining the capturing position in a coordinate system of the position detection system, based on a sensor signal from the motion sensor; and
   relating the surface model of the object to the position detection system, wherein relating the surface model of the object to the position detection system comprises:
      locating at least one point on the surface model in a coordinate system of the motion sensor; and
      transforming the location of the at least one point on the surface model in the coordinate system of the motion sensor to a location in the coordinate system of the position detection system, based on the capturing position,
   wherein locating at least one point on the surface model in the coordinate system of the motion sensor comprises transforming (i) a location of the at least one point on the surface model in a coordinate system of the surface model to (ii) a location in the coordinate system of the motion sensor, based on a calibration function comprising a calibration vector representing an offset between an image sensor of the image sensor unit and the motion sensor of the image sensor unit.

2. The method of claim 1, wherein the image sensor unit comprises one or more stereographic cameras.

3. The method of claim 1, wherein the image sensor unit comprises one or more cameras in a multi-camera arrangement.

4. The method of claim 1, wherein the image sensor unit comprises an infrared image sensor.

5. The method of claim 4, wherein the infrared image sensor is configured to project a pattern onto the object while capturing the image, wherein the projected pattern has known dimensions such that distortions of the pattern as projected onto a surface of the object and used to establish the three-dimensional surface of the object.

6. The method of claim 4, wherein the method further comprises:
   arranging a plurality of infrared markers on a surface of the object;
   detecting the infrared markers with the infrared image sensor; and
   photogrammetrically generating a surface topography of the surface model.

7. The method of claim 1, wherein the motion sensor is configured to detect at least one of an acceleration and a rotational rate of the image sensor unit.

8. The method of claim 1, wherein the surface model comprises a point cloud.

9. The method of claim 1, wherein determining the capturing position comprises:
   detecting motion of the image sensor unit along a path relative to the position detection system, based on the sensor signal from the motion sensor;
   defining a spatial relationship that relates at least one point on the path in a coordinate system of the motion sensor to a known position in a coordinate system of the position detection system; and determining the capturing position in the coordinate system of the position detection system based on the detected motion of the image sensor along the path and the defined spatial relationship.

10. The method of claim 9, wherein the path starts at the known position in the coordinate system of the position detection system and ends at the capturing position.

11. The method of claim 9, wherein the path starts at the capturing position and ends at the known position in the coordinate system of the position detection system.

12. The method of claim 1, wherein the position detection system is an electromagnetic position detection system.

13. The method of claim 12, wherein the position detection system has a working space having a predetermined electromagnetic field strength.

14. The method of claim 13, wherein the method comprises capturing the one or more images with the image sensor unit position at a capturing position outside of the working space.

15. The method of claim 1, wherein the object is a face of a subject depicted in the captured image.

16. The method of claim 14, wherein capturing the one or more images captured with an image sensor unit positioned at a capturing position further comprises:

analyzing streaming image data of the image sensor unit; and automatically triggering image capture based upon recognition of the object in a certain position relative to the image sensor unit.

17. The method of claim 14, wherein capturing the one or more images captured with an image sensor unit positioned at a capturing position further comprises:

analyzing streaming image data of the image sensor unit; and automatically triggering image capture based upon a positional relation between a reference position sensor attached to the object and the image sensor unit.

18. The method of claim 1, wherein the motion sensor is configured to track position of the image sensor unit along a path on which the image sensor unit is moved.

* * * * *